United States Patent
Wolfgram et al.

(10) Patent No.: US 11,635,265 B2
(45) Date of Patent: Apr. 25, 2023

(54) HINGED WATERBOX COVER

(71) Applicant: TRANE INTERNATIONAL INC., Davidson, NC (US)

(72) Inventors: Steven E. Wolfgram, La Crosse, WI (US); Daoud A. Jandal, La Crosse, WI (US); Bradley S. Wickersham, La Crosse, WI (US); Fred Eickstaedt, La Crosse, WI (US); James M. McCool, La Crescent, MN (US); Raymond S. Schafer, Holmen, WI (US); Ronald E. Schlicht, La Crosse, WI (US); Robert A. Harris, New Albin, IA (US); Steven E. Meloling, La Crosse, WI (US); Raghu Kumar, Bangalore (IN); Kishore Prabakaran, Bangalore (IN)

(73) Assignee: TRANE INTERNATIONAL INC., Davidson, NC (US)

( * ) Notice: Subject to any disclaimer, the term of this patent is extended or adjusted under 35 U.S.C. 154(b) by 1028 days.

(21) Appl. No.: 16/266,403

(22) Filed: Feb. 4, 2019

(65) Prior Publication Data

US 2019/0170454 A1    Jun. 6, 2019

Related U.S. Application Data

(62) Division of application No. 15/182,762, filed on Jun. 15, 2016, now Pat. No. 10,203,168.

(Continued)

(51) Int. Cl.
*F28F 9/02* (2006.01)
*B21D 53/40* (2006.01)
(Continued)

(52) U.S. Cl.
CPC ............ *F28F 9/0219* (2013.01); *B21D 53/40* (2013.01); *B23P 15/26* (2013.01); *E05D 3/04* (2013.01);
(Continued)

(58) Field of Classification Search
CPC .. B65D 90/10; F28F 9/0219; F28F 2280/105; G21C 13/073; B21D 53/40; E05D 3/04
See application file for complete search history.

(56) References Cited

U.S. PATENT DOCUMENTS 3,860,142 A * 1/1975 Jurges ................... B65D 90/10
                                                            220/240
4,801,423 A * 1/1989 Warren ................... G21F 7/005
                                                            976/DIG. 356

(Continued)

FOREIGN PATENT DOCUMENTS

CN        102459792 A    5/2012
CN        204301562 U    4/2015

OTHER PUBLICATIONS

Universal Hinge Corp. "Advantages of the Universal Hinge Brand Bolt on Hinge" can be found at http://www.universalhinge.com/features.html available at least as early as Nov. 2014.

(Continued)

*Primary Examiner* — Paul Alvare
(74) *Attorney, Agent, or Firm* — Hamre, Schumann, Mueller & Larson, P.C.

(57) ABSTRACT

A bolted hinge assembly is provided for a waterbox cover (a "waterbox hinge assembly"). The waterbox hinge assembly generally does not require welding on the waterbox cover or the heat exchanger in an HVAC system ("HVAC unit" hereinafter). Further, the waterbox hinge assembly may be installable to the HVAC unit without removing the heat exchange fluids (e.g., water, refrigerant, etc.) from the HVAC unit. In some cases, the waterbox hinge assembly can (Continued)

be installed on an HVAC unit without removing any bolts from the waterbox cover. Once installed, the waterbox hinge assembly can be left in place so that it can be reused anytime the HVAC unit is serviced.

11 Claims, 14 Drawing Sheets

Related U.S. Application Data

(60) Provisional application No. 62/210,732, filed on Aug. 27, 2015, provisional application No. 62/175,875, filed on Jun. 15, 2015.

(51) Int. Cl.
| | |
|---|---|
| *B23P 15/26* | (2006.01) |
| *E05D 3/04* | (2006.01) |
| *E05D 3/02* | (2006.01) |
| *F28D 7/16* | (2006.01) |
| *B65D 90/10* | (2006.01) |
| *G21C 13/073* | (2006.01) |

(52) U.S. Cl.
CPC ............... *B65D 90/10* (2013.01); *E05D 3/02* (2013.01); *E05D 2003/025* (2013.01); *F28D 7/16* (2013.01); *F28F 2280/105* (2013.01); *G21C 13/073* (2013.01); *Y10T 16/5321* (2015.01); *Y10T 16/546* (2015.01); *Y10T 29/24* (2015.01); *Y10T 29/49948* (2015.01); *Y10T 29/49963* (2015.01)

(56) References Cited

U.S. PATENT DOCUMENTS

| | | | | |
|---|---|---|---|---|
| 5,690,141 | A * | 11/1997 | Creaghe | B65D 90/10 137/382 |
| 6,167,977 | B1 * | 1/2001 | Adamson | B62D 25/10 16/361 |
| 7,556,160 | B2 * | 7/2009 | Porebski | B66C 23/203 212/179 |
| 8,596,697 | B1 * | 12/2013 | Haibel | F16J 13/18 292/256.5 |
| 8,650,714 | B2 | 2/2014 | Staude | |
| 8,802,023 | B1 * | 8/2014 | Lewis | A61L 2/00 422/305 |
| 2002/0100225 | A1 * | 8/2002 | Sisk | B65D 90/10 220/220 |
| 2006/0219649 | A1 * | 10/2006 | Wolfford, Sr. | B66C 23/208 220/212.5 |
| 2008/0256753 | A1 * | 10/2008 | DePietro | B65D 90/10 16/382 |
| 2008/0256866 | A1 * | 10/2008 | DePietro | F16J 13/18 212/179 |
| 2008/0307606 | A1 | 12/2008 | Karlsson | |
| 2010/0072204 | A1 * | 3/2010 | Smith | F16J 13/18 49/506 |
| 2010/0125997 | A1 * | 5/2010 | DePietro | B65D 90/10 29/426.2 |
| 2012/0285975 | A1 * | 11/2012 | DePietro | B65D 90/10 29/11 |
| 2013/0025209 | A1 * | 1/2013 | Lidster | F16J 13/10 49/506 |
| 2015/0308574 | A1 * | 10/2015 | Kegler | E05C 19/001 49/460 |

OTHER PUBLICATIONS

Office Action, Chinese Patent Application No. 2016104234055, dated Mar. 29, 2019, with partial English translation (10 pages).

* cited by examiner

HINGED WATERBOX COVER

FIELD

This disclosure relates generally to heating, ventilation, and air conditioning (HVAC) systems. More specifically, this disclosure relates to a waterbox for a heat exchanger, such as a shell-and-tube heat exchanger in an HVAC chiller system.

BACKGROUND

Shell-and-tube heat exchangers are often used, for example, in an HVAC chiller system as a condenser and/or an evaporator of the HVAC chiller system. Generally, the shell-and-tube heat exchangers are configured to include heat exchange tubes extending inside a sealed shell. The heat exchange tubes define a tube side configured to carry a first fluid (e.g., water, etc.) and the shell defines a shell side configured to carry a second fluid (e.g., refrigerant, etc.). The tube side and the shell side can form a heat exchange relationship to transfer heat between the first fluid and the second fluid. Some shell-and-tube heat exchangers may include a multi-pass design (e.g., two-pass design, etc.). An end of the shell-and-tube heat exchanger may be configured to have a return waterbox that is generally configured to receive the first fluid from the tube side in the first pass and return the first fluid to the tube side in the second pass.

SUMMARY

This disclosure relates generally to heating, ventilation, and air conditioning (HVAC) systems. More specifically, this disclosure relates to a waterbox for a heat exchanger, such as a shell-and-tube heat exchanger in an HVAC chiller system.

Embodiments described in this specification are generally directed to a mechanically connected hinge assembly for a waterbox cover (a "waterbox hinge assembly"). The waterbox hinge assembly generally does not require welding on the waterbox cover or the heat exchanger in an HVAC system ("HVAC unit" hereinafter). Further, the waterbox hinge assembly may be installable to the HVAC unit without removing the heat exchange fluids (e.g., water, refrigerant, etc.) from the HVAC unit. In some embodiments, the waterbox hinge assembly can be installed on an HVAC unit without removing any bolts from the waterbox cover. Once installed, the waterbox hinge assembly does not have to be removed during operation of the HVAC unit (e.g., is intended to be permanent) so that it can be used anytime the HVAC unit is serviced. In some embodiments, this can save labor time for using a lifting device every time the HVAC unit is serviced.

In some embodiments, the mechanically connected waterbox hinge assembly can be connected together using nuts, bolts, washers, pop rivets, adhesives, suitable combinations thereof, or the like. In some embodiments, the mechanically connected waterbox hinge assembly can be secured to the HVAC unit using nuts, bolts, washers, pop rivets, adhesives, suitable combinations thereof, or the like.

In some embodiments, the waterbox hinge assembly can generally be retrofitted onto an HVAC unit that is in the field. In some embodiments, the waterbox hinge assembly can be included on the HVAC unit during manufacturing. In some embodiments, a portion of the waterbox hinge assembly can be included during manufacturing and a portion can be retrofitted in the field.

In some embodiments, the waterbox hinge assembly can be installed on either end of the HVAC unit.

In some embodiments, the waterbox hinge assembly can be installed by a single technician. In some embodiments, the waterbox hinge assembly can be installed in at or about three hours. In some embodiments, the waterbox hinge assembly can be installed in less than three hours. It will be appreciated that the waterbox hinge assembly times will reasonably vary based on the technician completing the install and on particular configurations of the HVAC unit. Accordingly, the installation time can vary beyond the stated ranges.

In some embodiments, the waterbox hinge assembly is adjustable. In some embodiments the waterbox hinge assembly is adjustable in three-directions. In some embodiments, the adjustability allows for improved alignment of the waterbox hinge assembly with the waterbox cover and the HVAC unit. In some embodiments, the three-directions of adjustability generally correspond to a longitudinal direction of the HVAC unit, a vertical direction with respect to the floor on which the HVAC unit is located, and a left-right direction (perpendicular to both the vertical direction and the longitudinal direction).

In some embodiments a fingerplate and a cover-mounting band can be fixed to the waterbox cover using an adhesive. In some embodiments, the adhesive can be selected with a sufficient adhesion strength to securely hold the waterbox cover to the fingerplate when the weight of the waterbox cover is supported by the waterbox hinge assembly (such as, for example, when the waterbox cover is opened). In some embodiments, the adhesive can be a two-part epoxy. In some embodiments, the two-part epoxy can be a two-part, non-sag epoxy (e.g., a two-part epoxy that generally flows little or not at all when applied to a vertical surface).

A method of retrofitting a heating, ventilation, and air conditioning (HVAC) unit with a waterbox hinge assembly is disclosed. The method includes securing upper and lower support brackets to the HVAC unit; securing a center hinge member to a cover mount and upper and lower hinge members to the upper and lower support brackets; securing a hinge pin to the center hinge member and upper and lower hinge members; and securing the cover mount to a waterbox cover disposed on an end of the HVAC unit.

A method of retrofitting a heating, ventilation, and air conditioning (HVAC) unit with a waterbox hinge assembly is disclosed. The method includes securing a cover mount to a waterbox cover disposed on an end of the HVAC unit; securing a hinge-mounting bracket to the HVAC unit; securing upper and lower hinge members to the hinge-mounting bracket; securing a hinge pin to the center hinge member and upper and lower hinge members; and securing a center hinge member to the cover mount.

A waterbox hinge assembly is described. The waterbox hinge assembly includes a cover mount that is securable to a waterbox cover of a heating, ventilation, and air conditioning (HVAC) unit; an upper hinge member; a lower hinge member; a center hinge member disposed between the upper and lower hinge members; a hinge pin; and a hinge-mounting bracket that is securable to the HVAC unit. In an installed configuration, the center hinge member is fixed to the cover mount; the upper and lower hinge members are fixed to the hinge-mounting bracket; and the hinge pin is inserted into the upper and lower hinge members and the center hinge member.

A waterbox hinge assembly retrofitting kit is described. The waterbox hinge assembly includes a waterbox hinge assembly. The waterbox hinge assembly includes a cover mount that is securable to a waterbox cover of a heating, ventilation, and air conditioning (HVAC) unit; and a hinge assembly. The hinge assembly includes an upper hinge member; a lower hinge member; a center hinge member disposed between the upper and lower hinge members; and a hinge pin. The waterbox hinge assembly further includes a hinge-mounting bracket that is securable to the HVAC unit. In an installed configuration, the center hinge member is fixed to the cover mount; the upper and lower hinge members are fixed to the hinge-mounting bracket; and the hinge pin is inserted into the upper and lower hinge members and the center hinge member.

BRIEF DESCRIPTION OF THE DRAWINGS

References are made to the accompanying drawings that form a part of this disclosure, and which illustrate embodiments in which system and methods described in this specification can be practiced.

Like reference numbers represent like parts throughout.

DETAILED DESCRIPTION

Figure 1:
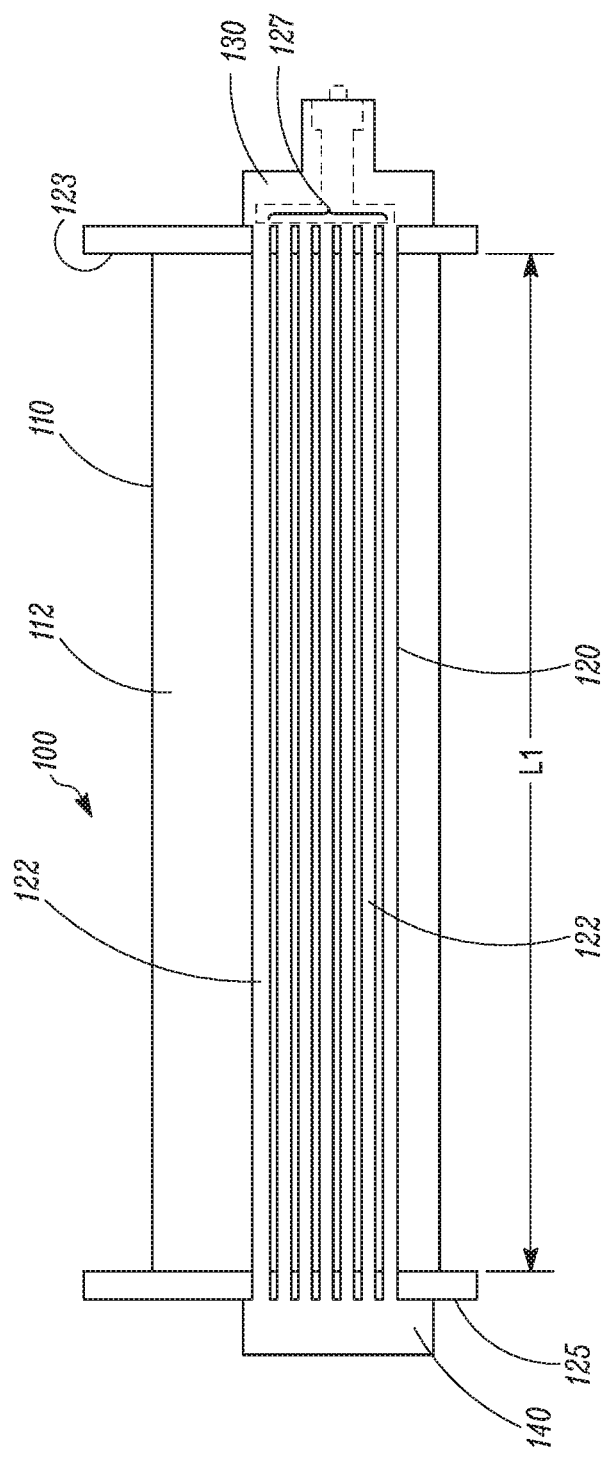
FIG. 1 is a schematic view of a shell-and-tube heat exchanger, according to some embodiments.

This disclosure relates generally to heating, ventilation, and air conditioning (HVAC) systems. More specifically, this disclosure relates to a waterbox for a heat exchanger, such as a shell-and-tube heat exchanger in an HVAC chiller system.

Generally, a waterbox cover may be installed without a factory-installed hinge. As a result, in order to remove the waterbox cover, a lifting device (e.g., a crane, etc.) is used. The waterbox cover may be, for example, removed to, for example, clean the tubes, etc. Removing the waterbox cover using a lifting device can be a safety risk, as the waterbox covers can weigh several hundred pounds. In some applications the waterbox cover can weigh at or about 400 pounds. In some applications the waterbox cover can weigh more than 400 pounds. In some applications the waterbox cover can weigh less than 400 pounds. It will be appreciated that the waterbox cover can vary in weight based on, for example, a size of the heat exchanger for which the waterbox cover is used. Accordingly, the weight of the waterbox cover can vary beyond the stated ranges above. For example, the lifting device can be used improperly, which can lead to severe injuries to the technician who is removing the waterbox cover. Further, the process of using the lifting device to remove the waterbox cover can be very time consuming and labor intensive.

Embodiments described in this specification are generally directed to a mechanically connected hinge assembly for a waterbox cover (a "waterbox hinge assembly"). The waterbox hinge assembly generally does not require welding on the waterbox cover or the heat exchanger in an HVAC system ("HVAC unit" hereinafter). Further, the waterbox hinge assembly may be installable to the HVAC unit without removing the heat exchange fluids (e.g., water, refrigerant, etc.) from the HVAC unit. In some embodiments, the waterbox hinge assembly can be installed on an HVAC unit without removing any bolts from the waterbox cover. Once installed, the waterbox hinge assembly does not have to be removed during operation of the HVAC unit (e.g., is intended to be permanent) so that it can be used anytime the HVAC unit is serviced. In some embodiments, this can save labor time for using a lifting device every time the HVAC unit is serviced. It will be appreciated that the hinge assembly can apply to devices other than a waterbox cover, such as, for example but not limited to, a boiler cover, or other non-hinged removable covers, according to the principles described in this specification.

In some embodiments, the mechanically connected waterbox hinge assembly can be connected together using nuts, bolts, washers, pop rivets, adhesives, suitable combinations thereof, or the like. In some embodiments, the mechanically connected waterbox hinge assembly can be secured to the HVAC unit using nuts, bolts, washers, pop rivets, adhesives, suitable combinations thereof, or the like. In some embodiments, the mechanically connected waterbox hinge assembly can be connected to the waterbox cover via a cover mount. In some embodiments, the cover mount includes a fingerplate. In some embodiments, the cover mount includes a cover mounting band with a fingerplate. In some embodiments, the cover mount includes a cover mounting band without a fingerplate.

In some embodiments, the waterbox hinge assembly can generally be retrofitted onto an HVAC unit that is in the field. In some embodiments, the waterbox hinge assembly can be included on the HVAC unit during manufacturing.

In some embodiments, the waterbox hinge assembly can be installed by a single technician. In some embodiments, the waterbox hinge assembly can be installed in at or about three hours. In some embodiments, the waterbox hinge assembly can be installed in less than three hours. It will be appreciated that the waterbox hinge assembly times will reasonably vary based on the technician completing the install. Accordingly, the installation time can vary beyond the stated ranges.

In some embodiments, the waterbox hinge assembly is adjustable. In some embodiments the waterbox hinge assembly is adjustable in three-directions. In some embodiments, the adjustability allows for improved alignment of the waterbox hinge assembly with the waterbox cover and the HVAC unit. In some embodiments, the three-directions of adjustability generally correspond to a longitudinal direction of the HVAC unit, a vertical direction with respect to the floor on which the HVAC unit is located, and a left-right direction (perpendicular to both the vertical direction and the longitudinal direction).

An "installed configuration," as used herein, generally indicates a configuration in which a waterbox hinge assembly is installed on a waterbox for a heat exchanger.

An "uninstalled configuration," as used herein, generally indicates a configuration in which a waterbox hinge assembly is not installed on a waterbox for a heat exchanger.

FIG. 1 illustrates a schematic view of a shell-and-tube heat exchanger 100 of two water passes, which can be used as a condenser and/or an evaporator in, for example, a commercial chiller. The heat exchanger 100 includes a shell 110 that generally defines a shell side 112; and heat exchanger tubes 120 that generally define a tube side 122. The heat exchanger tubes 120 are stacked inside the shell 110 to form a heat exchanger tube bundle 127.

The shell side 112 can be configured to carry a first fluid, such as refrigerant, and the tube side 122 can be configured to carry a second fluid, such as water. The first fluid in the shell side 112 can form a heat exchange relationship with the second fluid in the tube side 122.

The shell 110 of the heat exchanger 100 has a length L1 that defines a longitudinal direction. The shell 110 has a first end 123 and a second end 125 along the longitudinal direction. A water header 130 is attached to the first end 123 and is in fluid communication with the heat exchanger tubes 120 and the tube side 122. A return waterbox 140 is attached to the second end 125 and is in fluid communication with the heat exchanger tubes 120 and the tube side 122.

In operation, the water can be directed into the tube side 122 in the water header 130 from the water inlet 132. The water can flow through the heat exchanger tubes 120 in the longitudinal direction from the first end 123 to the second end 125. The water can flow out of the tube side 122 into the return waterbox 140 at the second end 125. In the return waterbox 140, the water can be directed into the tube side 122 to flow toward the first end 123. The water can then be directed out of the water header 130 at the first end 123 from the outlet 134.

The shell side 112 can be configured to carry, for example, refrigerant. If the heat exchanger 100 is configured to work as a condenser, the shell side 112 is generally configured to carry hot refrigerant vapor. The hot refrigerant vapor can release heat to the water in the tube side 122, and be condensed to liquid refrigerant. If the heat exchanger 100 is configured to work as an evaporator, the shell side 112 can be configured to carry, for example, cold liquid refrigerant or a refrigerant liquid/vapor mixture. The water in the tube side 122 can release heat to the liquid refrigerant and/or the refrigerant liquid/vapor mixture so as to lower a temperature of the water.

Figure 2A:
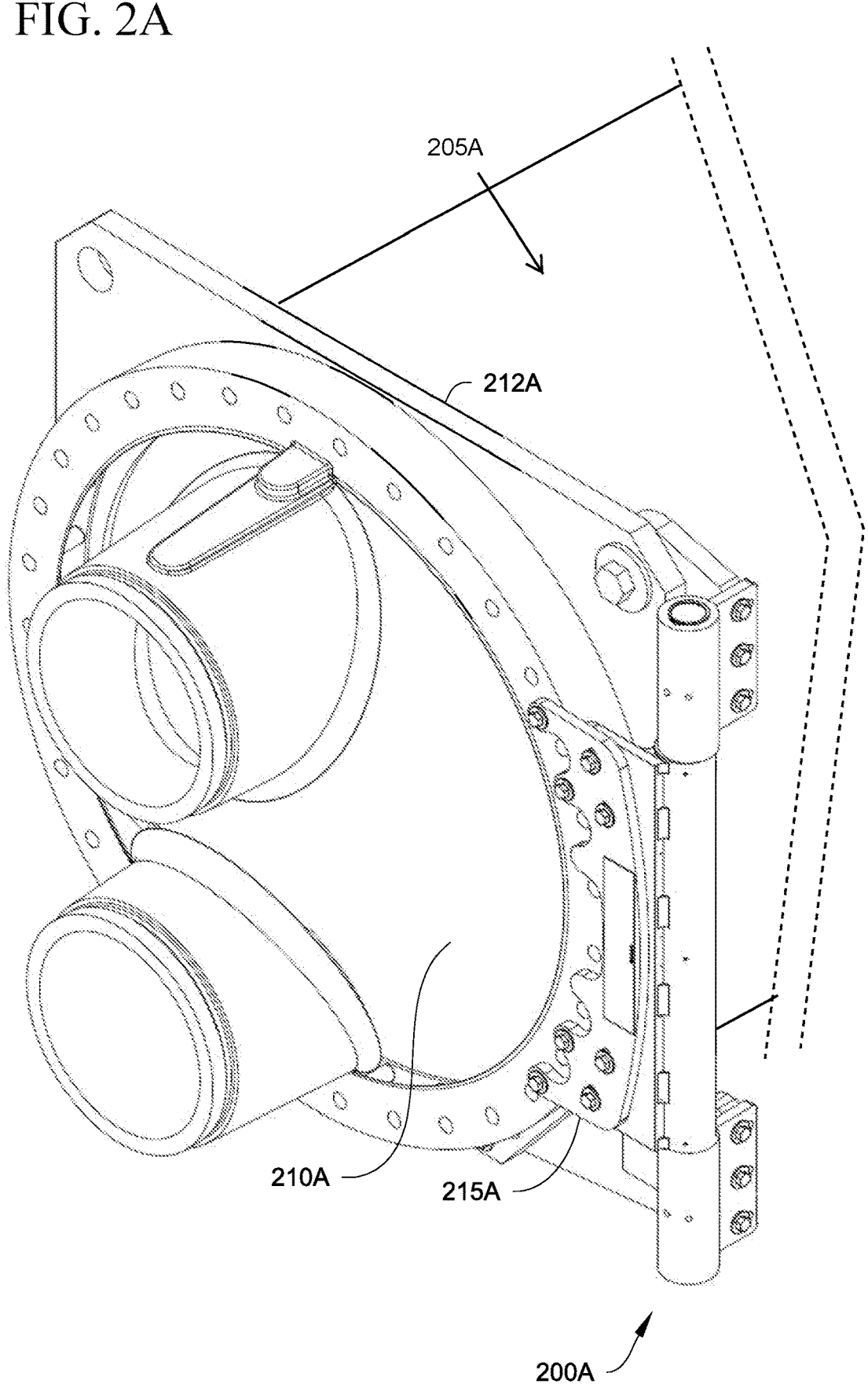
FIGS. 2A and 2B illustrate a waterbox hinge assembly in an installed configuration, according to some embodiments.
Figure 2B:
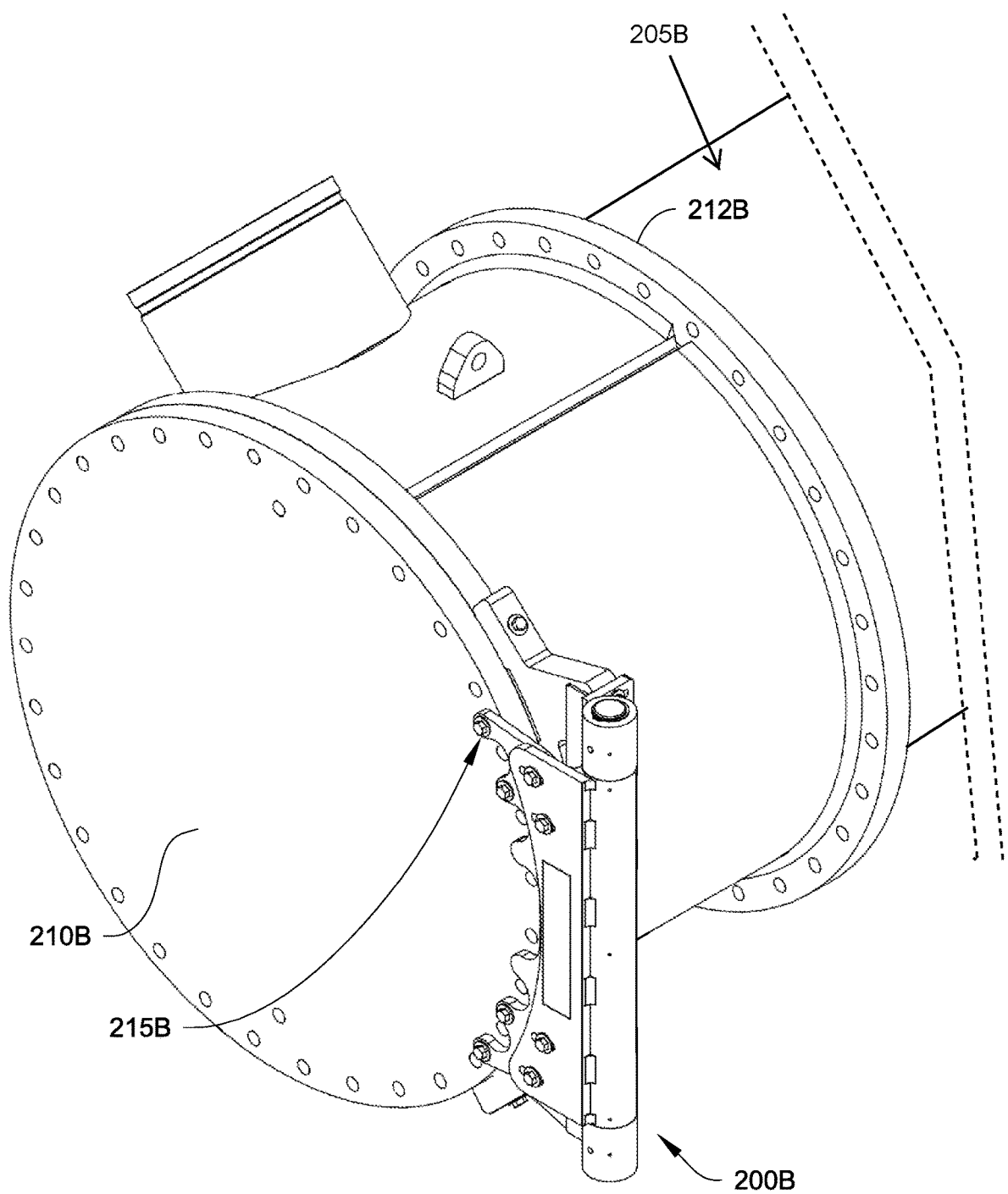

FIGS. 2A and 2B illustrate waterbox hinge assemblies 200A, 200B in an installed configuration, according to some embodiments. The waterbox hinge assemblies 200A, 200B generally represent two different waterbox hinge assembly embodiments. The waterbox hinge assembly 200A may generally be referred to as a non-marine embodiment. The waterbox hinge assembly 200B may generally be referred to as a marine embodiment. Aspects of the waterbox hinge assembly 200A may be the same as or similar to aspects of the waterbox hinge assembly 200B. For simplicity of this specification, the aspects which are the same will generally be discussed with respect to the waterbox hinge assembly 200A of FIG. 2A, but will not be further described in accordance with the waterbox hinge assembly 200B of FIG. 2B.

The waterbox hinge assembly 200A of FIG. 2A is installed on an end of the HVAC unit 205A. It will be appreciated that the waterbox hinge assembly 200A may be installable at either end of the HVAC unit 205A, according to some embodiments. The HVAC unit 205A is generally illustrated to be a heat exchanger, such as, but not limited to, a shell-and-tube style evaporator/condenser (see FIG. 1). The end of the HVAC unit 205A includes the waterbox cover 210A. The waterbox hinge assembly 200A is, when in the installed configuration, secured to the waterbox cover 210A and the HVAC unit 205A. The waterbox hinge assembly 200A is secured to the HVAC unit 205A at a tube sheet portion 212A. In the illustrated embodiment, the waterbox hinge assembly 200A is illustrated as being on a right side of the waterbox cover 210A. As a result, the illustrated waterbox cover 210A could be opened outwardly in a left-right direction. It will be appreciated that the waterbox hinge assembly 200A could alternatively be disposed on a left side of the waterbox cover 210A (not shown). In such an embodiment, the waterbox cover 210A would be openable outwardly in a right-left direction.

The waterbox hinge assembly 200B of FIG. 2B is installed on an end of the HVAC unit 205B. It will be appreciated that the waterbox hinge assembly 200B may be installable at either end of the HVAC unit 205B, according to some embodiments. The HVAC unit 205B is generally illustrated to be a heat exchanger, such as, but not limited to, a shell-and-tube style evaporator/condenser (see FIG. 1). The end of the HVAC unit 205B includes the waterbox cover 210B. The waterbox hinge assembly 200B is, when in the installed configuration, secured to the waterbox cover 210B and a portion of the HVAC unit 210B. In the marine embodiment of FIG. 2B, a tube sheet portion is not disposed at a location at which the waterbox hinge assembly 200A can be fixed. Accordingly, as will be described in additional detail in accordance with FIG. 3B below, the waterbox hinge assembly 200B is fixed to the HVAC unit 205B in a different manner than the waterbox hinge assembly 200A. In the illustrated embodiment, the waterbox hinge assembly 200B is illustrated as being on a left side of the waterbox cover 210B. As a result, the illustrated waterbox cover 210B could be opened outwardly in a right-left direction. It will be appreciated that the waterbox hinge assembly 200B could alternatively be disposed on a right side of the waterbox cover 210B (not shown). In such an embodiment, the waterbox cover 210B would be openable outwardly in a left-right direction.

In some embodiments, the HVAC unit 205A and the HVAC unit 205B can be the same HVAC unit, with HVAC unit 205A representing a first end of the HVAC unit and HVAC unit 205B representing a second end of the HVAC unit.

Figure 3A:
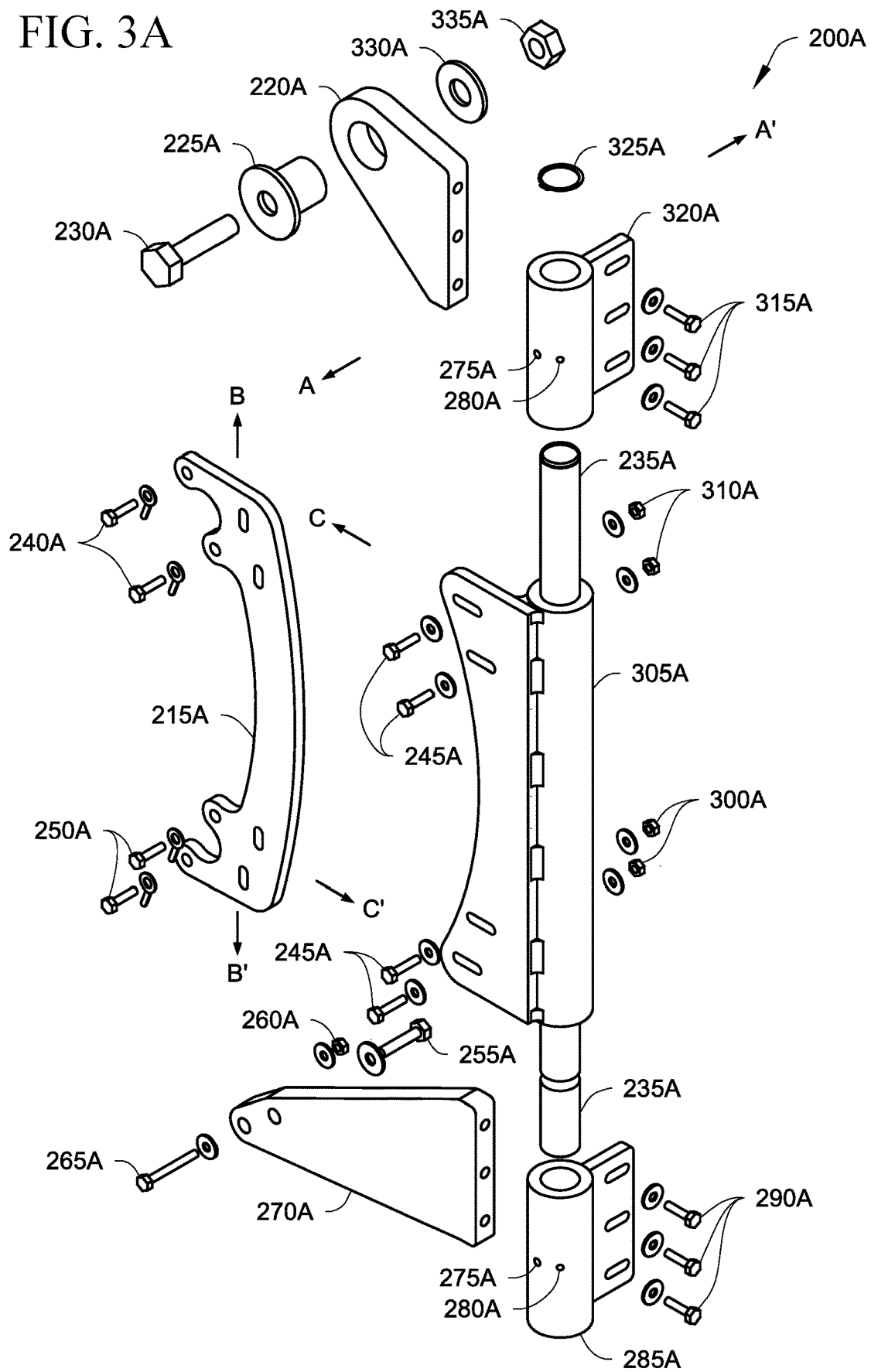
FIGS. 3A and 3B illustrate an exploded view of the waterbox hinge assemblies of FIGS. 2A and 2B (respectively) in an uninstalled configuration, according to some embodiments.
Figure 3B:
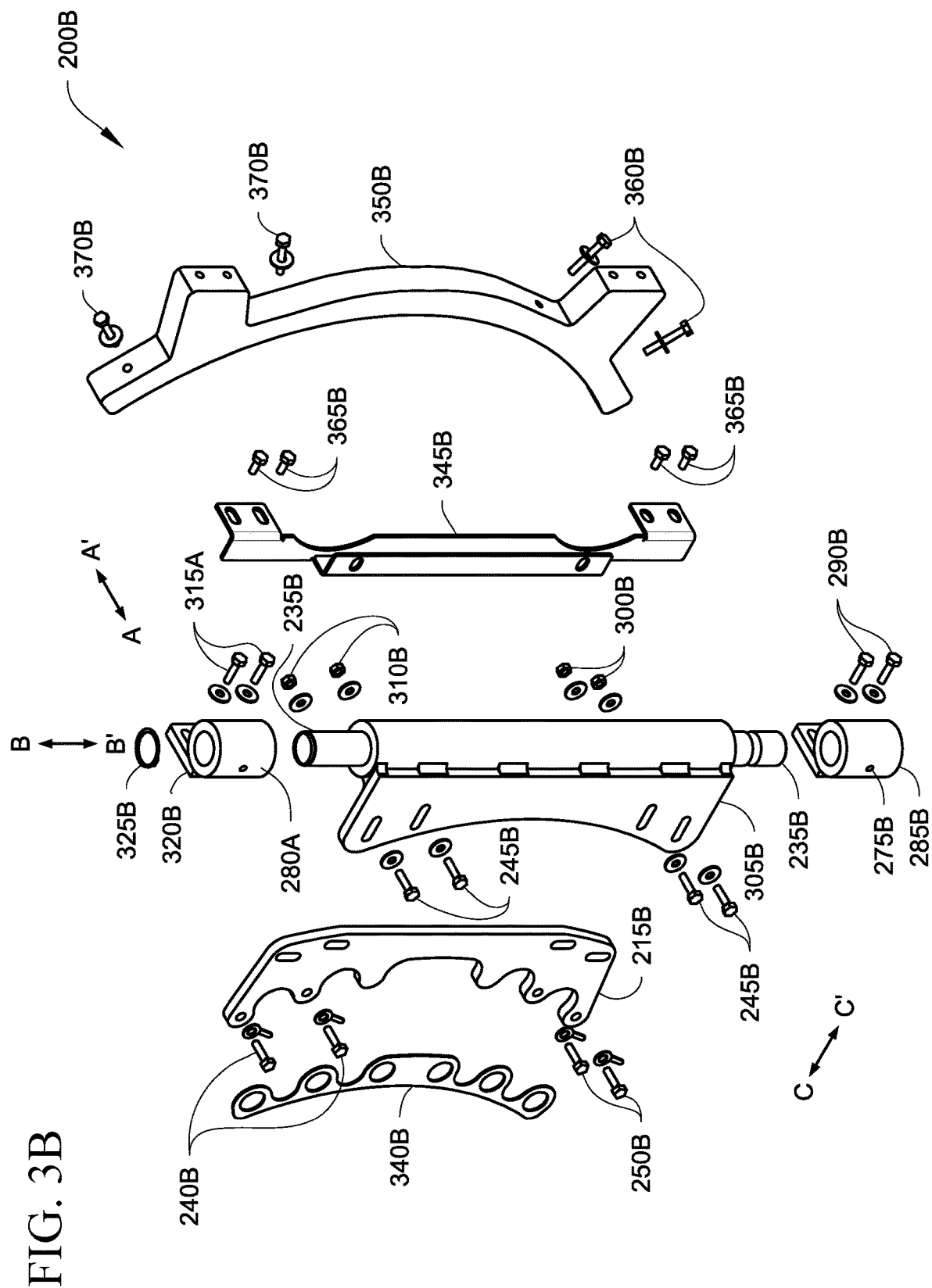

FIGS. 3A and 3B are exploded views of the waterbox hinge assemblies 200A, 200B in an uninstalled configuration, according to some embodiments. In some embodiments, aspects of the waterbox hinge assembly 200A of FIG. 3A and aspects of the waterbox hinge assembly 200B of FIG. 3B may be interchangeable. For example, a cover mount (e.g., fingerplate 215A) of FIG. 3A may be used in the waterbox hinge assembly 200B of FIG. 3B. Similarly, a cover mount (e.g., fingerplate 215B) of FIG. 3B may be used in the waterbox hinge assembly 200A of FIG. 3A. Other aspects may similarly be interchangeable.

FIG. 3A illustrates the waterbox hinge assembly 200A. As described above, the waterbox hinge assembly 200A can alternatively be referred to as the non-marine waterbox hinge assembly 200A. The waterbox hinge assembly 200A generally includes the fingerplate 215A, an upper support bracket 220A, a hinge pin 235A, a lower support bracket 270A, a lower hinge member 285A, a center hinge member 305A, and an upper hinge member 320A. The fingerplate 215A, upper support bracket 220A, hinge pin 235A, lower support bracket 270A, lower hinge member 285A, center hinge member 305A, and upper hinge member 320A are generally secured to each other and/or to the HVAC unit 205A (FIG. 2) using a plurality of fasteners. In the illustrated embodiment, the plurality of fasteners includes a combination of bolts, nuts, and washers. It will be appreciated that other types of fasteners may be used in place of the illustrated fasteners. For example, one or more of the fasteners may be replaced with a pop rivet or the like. In some embodiments, one or more portions of the waterbox hinge assembly can be secured using an adhesive. Adhesives suitable for such assembly include, but are not limited to, LSB60, LSB60NS, 2353, and 2353Y available from the 3M Company. The various components of the waterbox hinge assembly 200A are generally made of metal. The type of metal is generally not limiting. Examples of suitable metals include, but are not limited to, steel, aluminum, or the like. It will be appreciated that the components of the waterbox hinge assembly can be made of different materials. In some embodiments, the upper support bracket 220A and the lower support bracket 270A may be collectively referred to as a hinge-mounting bracket.

The upper support bracket 220A is generally secured to the HVAC unit 205A using a fastener 230A, washer 330A, and nut 335A. In some embodiments, a bushing 225A can be included such that the fastener 230A can be sized to fit in more than one waterbox hinge assembly 200A. That is, the upper support bracket 220A may be designed to work with a variety of HVAC units, and the bushing 225A can be used to vary a size of an aperture in the upper support bracket 220A without the fastener size 230A or the aperture size being varied for the different HVAC unit applications.

The fingerplate 215A is generally fixed to the waterbox cover 210A (FIG. 2A) relying on a series of apertures that are already present in the waterbox cover 210A. The fingerplate 215A and its mounting apertures are generally designed to align with the apertures in the waterbox cover 210A. It will be appreciated that to accomplish this, the waterbox hinge assembly 200A may be sized based on a particular HVAC unit application. In the illustrated embodiment, fasteners 240A and 250A are inserted into the apertures of the fingerplate 215A in order to secure the fingerplate 215A to the waterbox cover 210A. In the illustrated embodiment, the fasteners 240A and 250A are generally representative of a bolt and washer. In some embodiments, the apertures on the waterbox cover 210A are tapped based on the thread configuration of the fasteners 240A, 250A. It will be appreciated that the apertures of the waterbox cover 210A may not be tapped if a different type of fastener is used (e.g., a pop rivet, etc.). In some embodiments, the fingerplate 215A can alternatively be a continuous plate covering one or more of the series of apertures in the waterbox cover 210A.

The lower support bracket 270A is generally secured to the HVAC unit 205A using a fastener 265A and nut/washer 260A. In some embodiments, similar to the upper support bracket 220A, a bushing can be included for the fastener 265A (not shown).

The upper hinge member 320A is secured to the upper support bracket 220A using, for example, fasteners 315A. The upper hinge member 320A generally functions as an upper cap to hold the hinge pin 235A in the installed configuration. The apertures for securing the upper hinge member 320A to the upper support bracket 220A can be designed such that the upper hinge member 320A can be moved when aligning the lower hinge member 285A, center hinge member 305A, and upper hinge member 320A with the fingerplate 215A. For example, in the illustrated embodiment the apertures are elongated in a first direction such that the upper hinge member 320A can be translated in either an A or A' direction. When in the installed configuration, the A direction would be toward the waterbox cover 210A, and the A' direction would be away from the waterbox cover 210A.

The lower hinge member 285A is generally the same as or similar to the upper hinge member 320A. The lower hinge member 285A is secured to the lower support bracket 270A using, for example, fasteners 290A.

In some embodiments, the upper and lower hinge members 320A, 285A include a setscrew 275A and a grease fitting 280A. In some embodiments, the grease fitting 280A is a Zerk fitting. One or more additional grease fittings 280A may be included. Generally, the grease fitting 280A and any additional grease fittings 280A may be disposed such that it is possible to add grease to the assembly after it is assembled rather than prior to assembly. This can, for example, reduce slipperiness of the hinge pin 235A when assembling the hinge assembly 200A. The setscrews 275A are generally used to maintain the hinge pin 235A in the installed configuration. The grease fitting 280A is generally used to add grease such that the hinge pin 235 is more smoothly rotatable in the upper and lower hinge members 320A, 285A. In some embodiments, a recess can be made in the hinge pin 235A to receive the setscrews 275A when in the installed configuration.

The center hinge member 305A is generally secured to the fingerplate 215A using fasteners 245A and washers/nuts 300A, 310A. Similarly to the upper and lower hinge members 320A, 285A, the apertures of the center hinge member 305A and the apertures of the fingerplate 215A are designed to allow for alignment of the center hinge member 305A and the fingerplate 215A. For example, the apertures of the fingerplate 215A are elongated in a B-B' direction to align the fingerplate 215A and the center hinge member 305A in either the B or the B' direction. Generally, the B-B' direction is vertically up or down when in an installed configuration. Similarly, the apertures of the center hinge member 305A are elongated in a C-C' direction to align the fingerplate 215A and the center hinge member 305A in either the C or the C' direction. Generally, the C-C' direction is horizontally left—right when in an installed configuration. The alignment apertures can, in some embodiments, provide for greater differences among HVAC units when installing the waterbox hinge assembly 200A. Once the fingerplate 215A, center hinge member 305A, and the upper and lower hinge members 320A, 285A are secured together, the hinge pin 235A can be inserted into the upper hinge member 320A and slid into place, resting in the lower hinge member 285A. A snap ring 325A can be added to a location on the hinge pin 235A at about the upper hinge member 320A to secure the hinge pin 235A in place and prevent it from sliding out of the upper hinge member 320A.

Once in the installed configuration, the waterbox hinge assembly 200A can be used to swing the waterbox cover 210A open, with the waterbox hinge assembly 200A supporting the weight of the waterbox cover 210A. In general, to open the waterbox cover 210A, a series of bolts would be removed from the waterbox cover 210A. In order to prevent a technician from accidentally removing the fasteners 240A, 250A which secure the fingerplate 215A to the waterbox cover 210A, a tool prevention member may be used with the fasteners 240A, 250A. In some embodiments, the tool prevention member can be, for example, a tabbed washer that is bent such that a standard tool cannot be used to remove the fasteners 240A, 250A. If the waterbox hinge assembly 200A were to need servicing or adjustment, the tabbed washer could be bent such that a standard tool could be used to remove the fasteners 240A, 250A.

In some embodiments, the waterbox hinge assembly 200A is adjustable. In some embodiments the waterbox hinge assembly 200A is adjustable in three-directions. In some embodiments, the adjustability allows for improved alignment of the waterbox hinge assembly 200A with the waterbox cover 210A and the HVAC unit 205A. In some embodiments, the three-directions of adjustability generally correspond to a longitudinal direction of the HVAC unit (A-A'), a vertical direction (B-B') with respect to the floor on which the HVAC unit is located, and a left-right direction (C-C') (e.g., perpendicular to both the vertical direction and the longitudinal direction).

In some embodiments, the waterbox hinge assembly 200A is assembled by securing the upper and lower support brackets 220A, 270A to the tube sheet portion 212A of the HVAC unit 205A. The upper hinge member 320A and the lower hinge member 285A are respectively secured to the upper and lower support brackets 220A, 270A. The center hinge member 305A is secured between the upper and lower hinge members 320A, 285A using the hinge pin 235A. The fingerplate 215A is secured to the center hinge member 305A and to the waterbox cover 210A.

In some embodiments, the waterbox hinge assembly 200A can include one or more spacers. The one or more spacers can be used to, for example, modify the alignment between the different components of the waterbox hinge assembly 200A and the HVAC unit 205A to which the assembly is being installed. This can, for example, account for manufacturing variations between various HVAC units on which the waterbox hinge assembly 200A is being installed. For example, a spacer can be placed between the upper support bracket 220A and the upper hinge member 320A to provide additional tolerance to the alignment between the fingerplate 215A and the center hinge member 305A. In such an example, a spacer may similarly be placed between the lower support bracket 270A and the lower hinge member 285A. In another example, a spacer may be placed between the fingerplate 215A and the center hinge member 305A to provide additional tolerance to the alignment between the upper hinge member 320A and the upper support bracket 220A and/or the lower support bracket 270A and the lower hinge member 285A. It will be appreciated that in some embodiments a spacer may be placed in both of these locations.

Further, in some embodiments, one or more shims may be used to account for manufacturing tolerances. In some embodiments, use of shims in the waterbox hinge assembly 200A can, for example, be used to reduce likelihood of sagging caused by, for example, the weight of the waterbox cover 210A.

In some embodiments, when the waterbox hinge assembly 200A can be included in a waterbox hinge retrofitting kit, the kit may include the waterbox hinge assembly 200A. It will be appreciated that one or more other items may be included in the waterbox hinge retrofitting kit, such as, but not limited to, assembly instructions, safety warnings, tools, or the like.

FIG. 3B illustrates the waterbox hinge assembly 200B. As described above, the waterbox hinge assembly 200B can alternatively be referred to as the marine waterbox hinge assembly 200B. The waterbox hinge assembly 200B generally includes the fingerplate 215B, a hinge pin 235B, a lower hinge member 285B, a center hinge member 305B, an upper hinge member 320B, and a hinge-mounting bracket 350B.

FIG. 3B also includes a fingerplate-locating gauge 340B and an installation bracket 345B. The fingerplate-locating gauge 340B and the installation bracket 345B are generally not features of the waterbox hinge assembly 200B. The fingerplate-locating gauge 340B and the installation bracket 345B are components which are used in the assembly process of some embodiments, such as the assembly process of a marine embodiment. Once the assembly process is complete, the fingerplate-locating gauge 340B and the installation bracket 345B may generally be discarded, returned to an installation kit, or the like.

The fingerplate-locating gauge 340B is used to identify a location at which the fingerplate 215B is to be secured to the waterbox cover 210B. Unlike the waterbox hinge assembly 200A, the fingerplate 215B is not installed into existing apertures of the waterbox cover 210B. Accordingly, the fingerplate-locating gauge 340B is used to determine drilling locations at which the fingerplate 215B will be secured. The drilling locations are generally located in a similar location to the apertures in the waterbox cover 210B. Once the drilling locations are identified using the fingerplate-locating gauge 340B, and the drilling locations are drilled and tapped, the fingerplate 215B can be secured to the waterbox cover 210B using fasteners 240B, 250B. The installation bracket 345B can then be fixed to the fingerplate 215B. The installation bracket 345B can be secured to the fingerplate 215B. Once the installation bracket 345B is installed to the fingerplate 215B, the hinge-mounting bracket 350B can be secured to the installation bracket 345B. The installation bracket 345B provides a temporary mounting location for the hinge-mounting bracket 350B in order to identify drilling locations at which the hinge-mounting bracket 350B will be secured to a flange of the HVAC unit 205B. The hinge-mounting bracket 350B generally replaces the upper and lower support brackets 220A, 270A of the waterbox hinge assembly 200A due to the different configuration of the HVAC unit 205B (e.g., the HVAC unit 205B does not include a tube sheet at the location of the waterbox cover 210B).

Once the drilling locations are identified, the hinge-mounting bracket 350B and the installation bracket 345B can be removed from the waterbox hinge assembly 200B. The hinge-mounting bracket 350B can be secured to the flange of the HVAC unit 205B using the drilling locations which were identified. Once secured, the upper and lower hinge members 320B, 285B can be secured to the hinge-mounting bracket 350B. The fingerplate 215B can be secured to the center hinge member 305B. Once the fingerplate 215B, center hinge member 305B, and the upper and lower hinge members 320B, 285B are secured together, the hinge pin 235B can be inserted into the upper hinge member 320B and slid into place, resting in the lower hinge member 285B. A snap ring 325B can be added to a location on the hinge pin 235B at about the upper hinge member 320B to secure the hinge pin 235B in place and prevent it from sliding out of the upper hinge member 320B.

Once in the installed configuration, the waterbox hinge assembly 200B can be used to swing the waterbox cover 210B open, with the waterbox hinge assembly 200B supporting the weight of the waterbox cover 210B. In general, to open the waterbox cover 210B, a series of bolts would be removed from the waterbox cover 210B. In order to prevent a technician from accidentally removing the fasteners 240B, 250B, which secure the fingerplate 215B to the waterbox cover 210B, a tool prevention member may be used with the fasteners 240B, 250B. In some embodiments, the tool prevention member can be, for example, a tabbed washer that is bent such that a standard tool cannot be used to remove the fasteners 240B, 250B. If the waterbox hinge assembly 200B were to need servicing or adjustment, the tabbed washer could be bent such that a standard tool could be used to remove the fasteners 240B, 250B.

In some embodiments, the waterbox hinge assembly 200B is adjustable. In some embodiments the waterbox hinge assembly 200B is adjustable in three-directions. In some embodiments, the adjustability allows for improved alignment of the waterbox hinge assembly 200B with the waterbox cover 210B and the HVAC unit 205B. In some embodiments, the three-directions of adjustability generally correspond to a longitudinal direction of the HVAC unit (A-A'), a vertical direction (B-B') with respect to the floor on which the HVAC unit is located, and a left-right direction (C-C') (e.g., perpendicular to both the vertical direction and the longitudinal direction).

In some embodiments, the waterbox hinge assembly 200B is assembled by clamping the fingerplate 215B to the waterbox cover 210B. The fingerplate-locating gauge 340B is used to identify drilling locations for the fingerplate 215B. Using the drilling locations, the fingerplate 215B is secured to the waterbox cover 210B. The installation bracket 345B is secured to the fingerplate 215B to identify drilling locations for the hinge-mounting bracket 350B. After the drilling locations are identified, the hinge-mounting bracket 350B can be removed. Using the drilling locations, the hinge-mounting bracket 350B is secured to the HVAC unit 205B. The upper hinge member 320B and the lower hinge member 285B are respectively secured to the hinge-mounting bracket 350B. The center hinge member 305B is secured between the upper and lower hinge members 320B, 285B using the hinge pin 235B. The fingerplate 215B is secured to the center hinge member 305B.

In some embodiments, the waterbox hinge assembly 200B can include one or more spacers. The one or more spacers can be used to, for example, modify the alignment between the different components of the waterbox hinge assembly 200B and the HVAC unit 205B to which the assembly is being installed. This can, for example, account for manufacturing variations between various HVAC units on which the waterbox hinge assembly 200B is being installed. For example, a spacer can be placed between the hinge-mounting bracket 350B and the upper hinge member 320B to provide additional tolerance to the alignment between the fingerplate 215B and the center hinge member 305B. In such an example, a spacer may similarly be placed between the hinge-mounting bracket 350B and the lower hinge member 285B. In another example, a spacer may be placed between the fingerplate 215B and the center hinge member 305B to provide additional tolerance to the alignment between the upper hinge member 320B and the hinge-mounting bracket 350B and/or the hinge mounting bracket 350B and the lower hinge member 285B. It will be appreciated that in some embodiments a spacer may be placed in both of these locations.

Further, in some embodiments, one or more shims may be used to account for manufacturing tolerances. In some embodiments, use of shims in the waterbox hinge assembly 200B can, for example, be used to reduce likelihood of sagging caused by, for example, the weight of the waterbox cover 210B.

In some embodiments, when the waterbox hinge assembly 200B is included in a waterbox hinge retrofitting kit, the kit may include the waterbox hinge assembly 200B, the fingerplate-locating gauge 340B, and the installation bracket 345B. It will be appreciated that one or more other items may be included in the waterbox hinge retrofitting kit, such as, but not limited to, assembly instructions, safety warnings, tools, or the like.

Figure 4A:
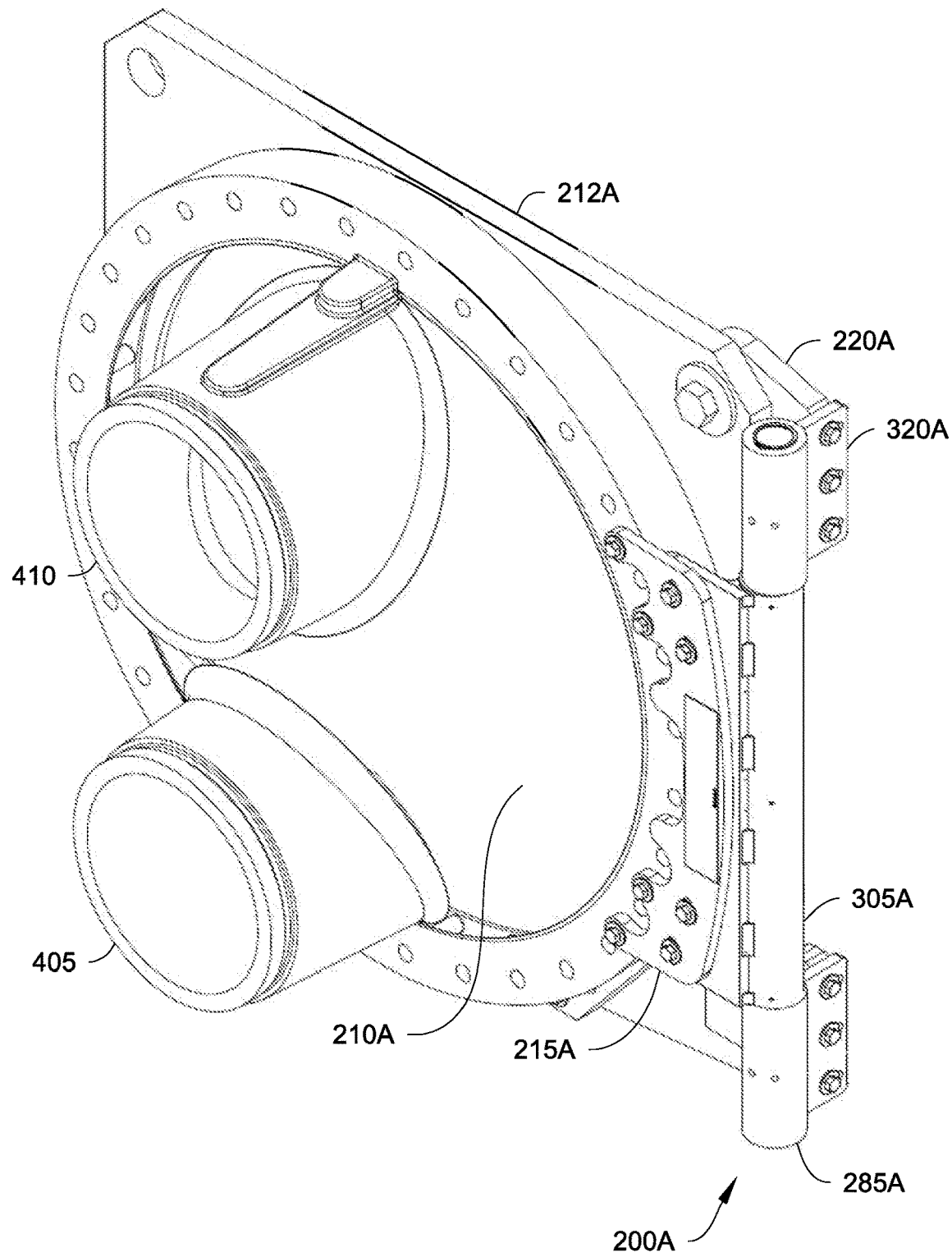
FIGS. 4A-4C illustrate a waterbox hinge assembly in an installed configuration, according to some embodiments.
Figure 4B:
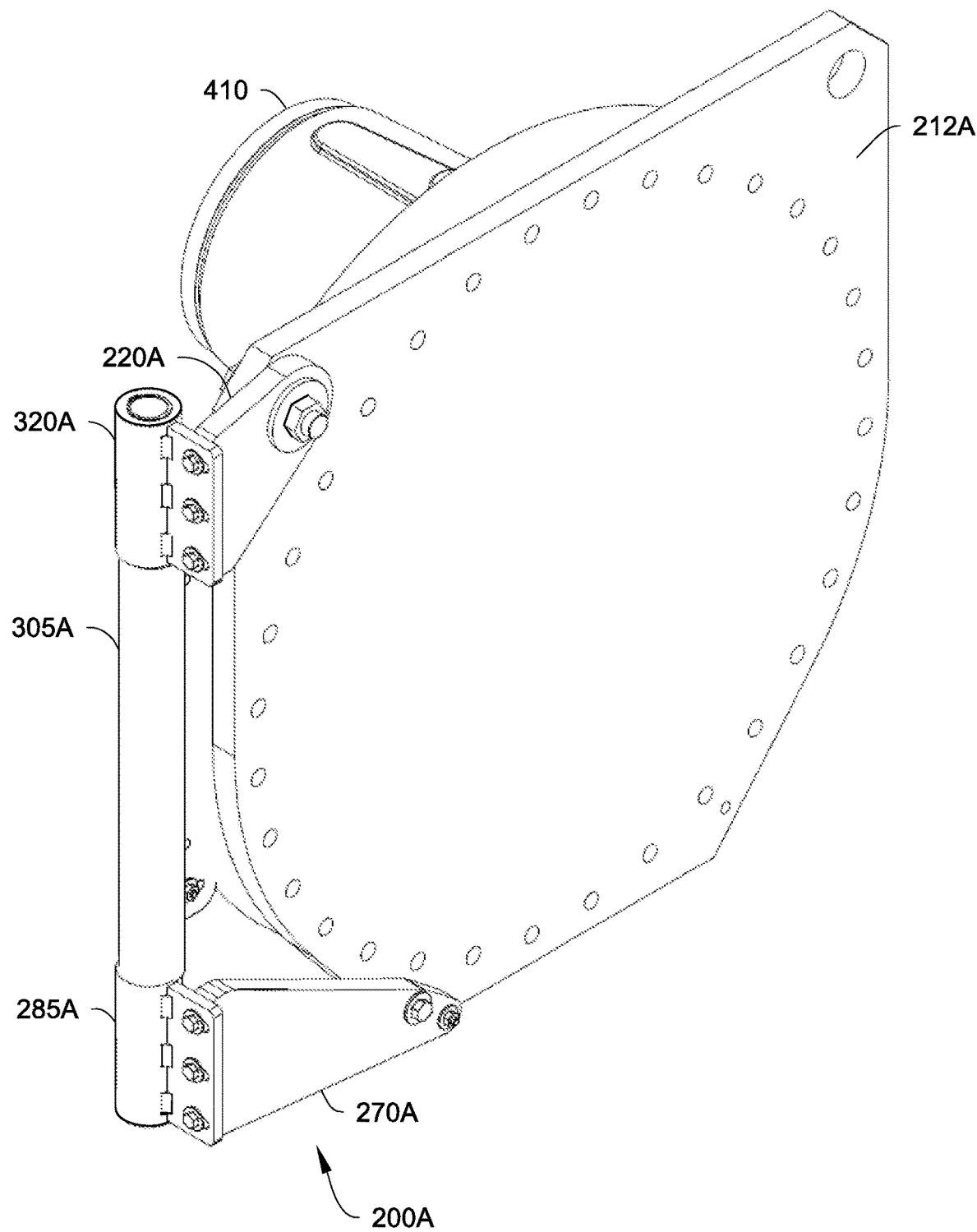
Figure 4C:
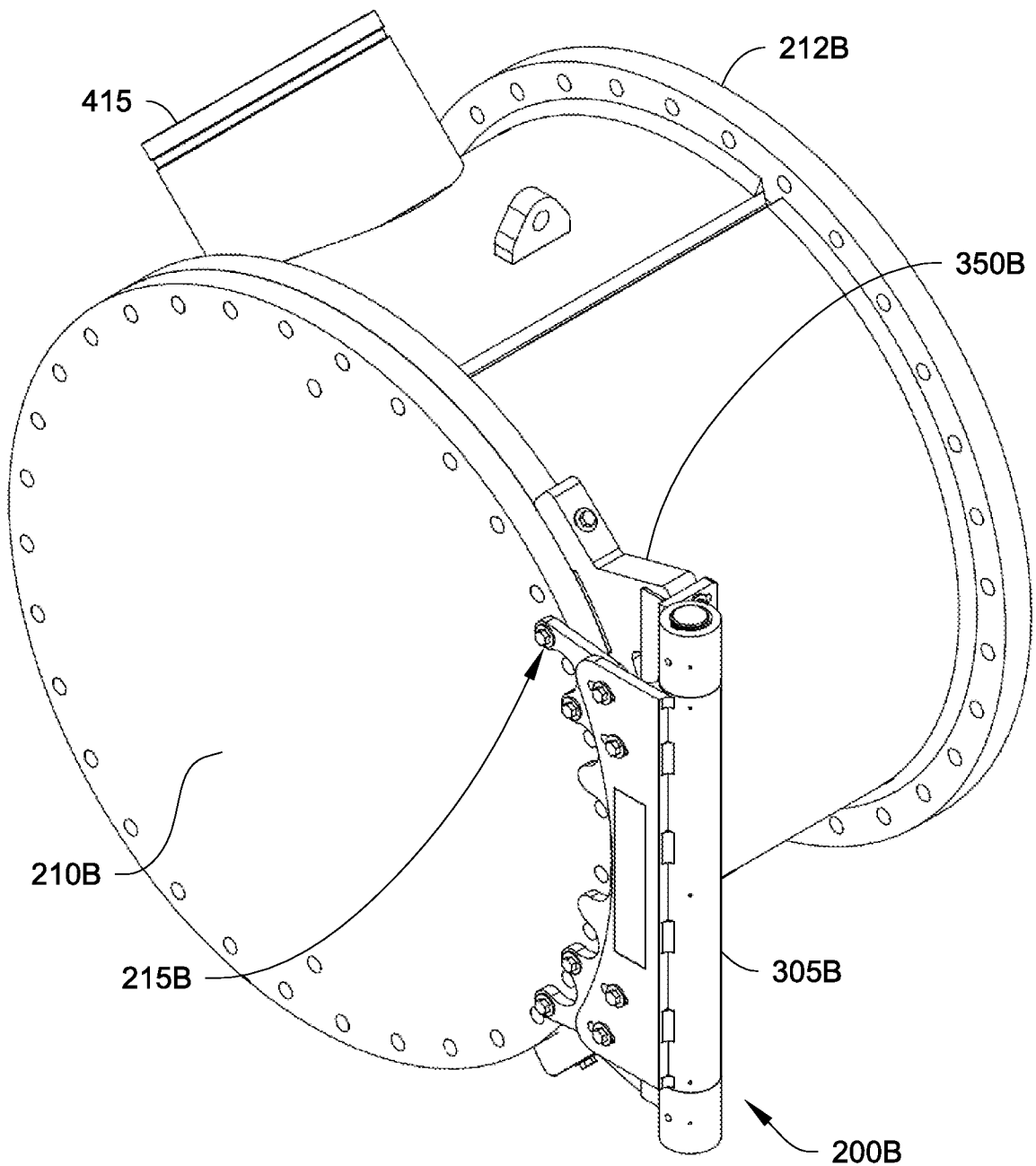

FIGS. 4A-4C illustrate waterbox hinge assemblies 200A (FIGS. 4A-4B), 200B (FIG. 4C) in an installed configuration, according to some embodiments. FIGS. 4A-4C are similar to FIGS. 2A and 2B, but do not include the HVAC units 205A and 205B (respectively) for clarity.

As illustrated in FIGS. 4A-4B, the waterbox cover 210A includes first and second pipe connections 405 and 410. The first pipe connection 405 can serve as a fluid return connection and the second pipe connection 410 can serve as a fluid supply connection. In some embodiments the first pipe connection 405 can serve as the fluid supply connection and the second pipe connection 410 can serve as the fluid return connection. The waterbox cover 210A in the illustrated embodiment is generally representative of a waterbox cover for a two-pass evaporator. It will be appreciated that a one-pass waterbox cover may include a single supply connection.

As illustrated in FIG. 4C, a pipe connection 415 is illustrated between the waterbox cover 210B and the tube sheet 212B. The pipe connection 415 can serve as a fluid supply connection or a fluid return connection, depending upon a configuration of the HVAC unit with which the waterbox cover is being used.

Figure 5A:
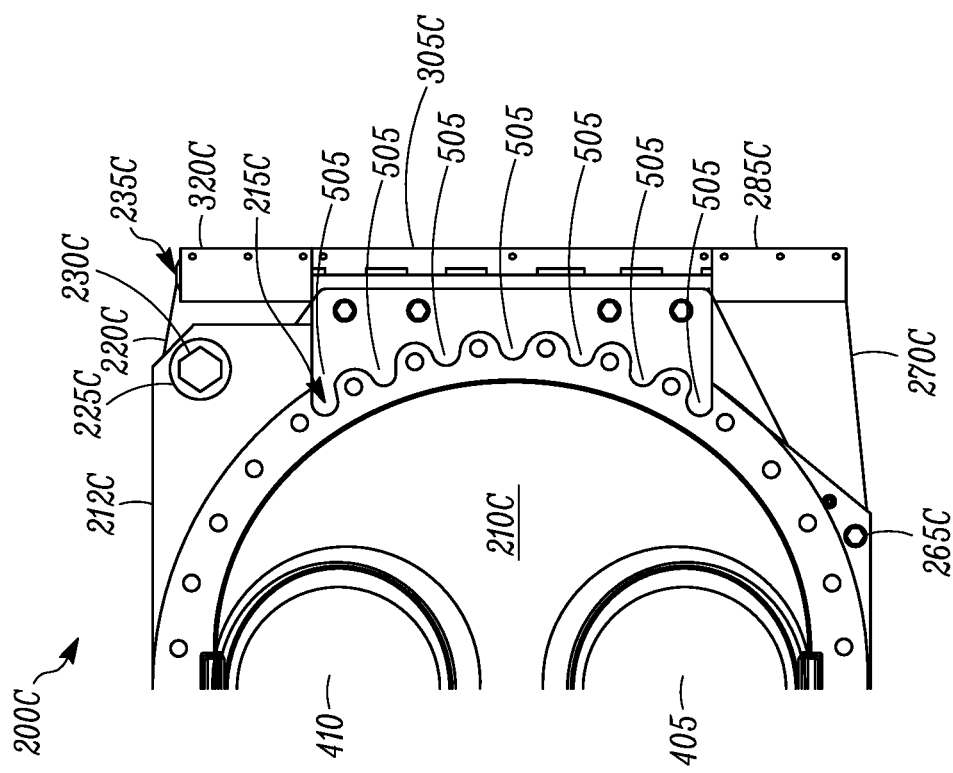
FIGS. 5A and 5B illustrate a waterbox hinge assembly in an installed configuration, according to some embodiments.
Figure 5B:
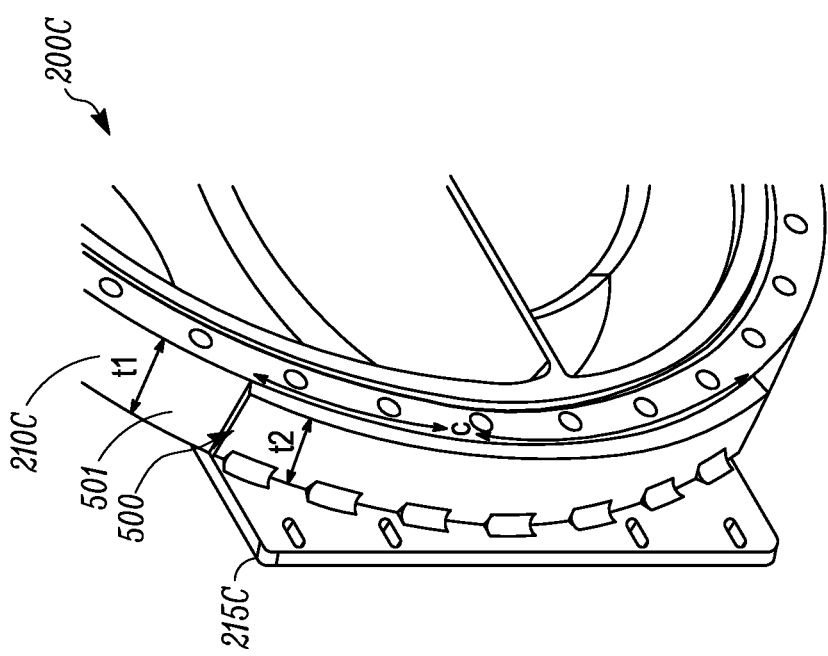

FIGS. 5A and 5B illustrate a waterbox hinge assembly 200C in an installed configuration, according to some embodiments. FIG. 5A illustrates a front view of the waterbox hinge assembly 200C and FIG. 5B shows a rear view of a portion of the waterbox hinge assembly 200C.

The waterbox hinge assembly 200C generally represents another embodiment of a waterbox hinge assembly, similar to the waterbox hinge assemblies 200A, 200B, as described in accordance with FIGS. 1-4 above. Accordingly, aspects of the waterbox hinge assembly 200C may be the same as or similar to aspects of the waterbox assemblies 200A, 200C. For simplicity of this specification, the aspects which are the same will generally not be described further than as previously described.

The waterbox hinge assembly 200C can be installed on an end of an HVAC unit (e.g., HVAC units 205A, 205B of FIGS. 2A-2B). It will be appreciated that the waterbox hinge assembly 200C may be installable at either end of the HVAC unit, according to some embodiments. The HVAC unit includes the waterbox cover 210C. The waterbox hinge assembly 200C, when in the installed configuration, is secured to the waterbox cover 210C and the HVAC unit. The waterbox hinge assembly 200C is secured to the HVAC unit at a tube sheet portion 212C. In the illustrated embodiment, the waterbox hinge assembly 200C is illustrated as being on a right side of the waterbox cover 210C. As a result, the illustrated waterbox cover 210C could be opened outwardly in a left-right direction. It will be appreciated that the waterbox hinge assembly 200C could alternatively be disposed on a left side of the waterbox cover 210C (not shown). In such an embodiment, the waterbox cover 210C would be openable outwardly in a right-left direction.

The waterbox hinge assembly 200C generally includes a fingerplate 215C, an upper support bracket 220C, a hinge pin 235C, a lower support bracket 270C, a lower hinge member 285C, a center hinge member 305C, an upper hinge member 320C, and a cover-mounting band 500. In the illustrated embodiment, the waterbox hinge assembly 200C may generally be referred to as a non-marine embodiment. The waterbox hinge assembly 200C may also be configured as a marine embodiment.

The fingerplate 215C, upper support bracket 220C, hinge pin 235C, lower support bracket 270C, lower hinge member 285C, center hinge member 305A, and upper hinge member 320A are generally secured to each other and/or to the HVAC unit using an adhesive.

In the illustrated embodiment, the fingerplate 215C includes a plurality of fingers 505 which are designed to fit between a series of apertures that are present in the waterbox cover 210C which are generally used to fix the waterbox cover 210C to the HVAC unit. The plurality of fingers 505 are designed to provide adhesion surfaces on a front face of the waterbox cover 210C. It will be appreciated that in some embodiments, the fingers 505 can alternatively be a continuous plate covering the series of apertures in the waterbox cover 210C and can alternatively be referred to as the plate 215C. The fingerplate 215C also includes the cover-mounting band 500. The cover-mounting band 500 is secured to the fingerplate 215C. In some embodiments, the cover-mounting band 500 can be, for example, welded to the fingerplate 215C. The cover-mounting band 500 can provide additional adhesion surface on a cylindrical face 501 of the waterbox cover 210C. The cylindrical face 501 has a width t1 and the cover-mounting band 500 has a width t2. In some embodiments, the width t1 and the width t2 can be about the same. In some embodiments, the width t1 can be larger than the width t2. In some embodiments, the width t1 can be smaller than the width t2.

The fingerplate 215C and the cover-mounting band 500 can be fixed to the waterbox cover 210C using an adhesive. The adhesive can generally be a two-part epoxy selected with a sufficient adhesion strength to securely hold the waterbox cover 210C to the fingerplate 215C when the waterbox cover 210C is opened and the weight of the waterbox cover 210C is supported by the waterbox hinge assembly 200C. In some embodiments, the two-part epoxy can be a two-part, non-sag epoxy (e.g., a two-part epoxy that generally flows little or not at all when applied to a vertical surface). An example of a suitable two-part, non-sag epoxy commercially available includes, but is not limited to, DP420NS, which is available from the 3M Company. The cover-mounting band 500 extends a distance c around the circumference of the waterbox cover 210C. It will be appreciated that the adhesive can, in some embodiments, be a one-part epoxy or other suitable adhesive selected based on a weight of the waterbox cover 210C and a safety factor.

Once in the installed configuration, the waterbox hinge assembly 200C can be used to swing the waterbox cover 210C open, with the waterbox hinge assembly 200C supporting the weight of the waterbox cover 210C. In general, to open the waterbox cover 210C, a series of bolts would be removed from the waterbox cover 210C.

In some embodiments, the waterbox hinge assembly 200C is adjustable. In some embodiments the waterbox hinge assembly 200C is adjustable in three-directions. In some embodiments, the adjustability allows for improved alignment of the waterbox hinge assembly 200C with the waterbox cover 210C and the HVAC unit on which it is installed. In some embodiments, the three-directions of adjustability generally correspond to a longitudinal direction of the HVAC unit (into and out of the page in FIG. 5A), a vertical direction (up-down in FIG. 5A) with respect to the floor on which the HVAC unit is located, and a left-right direction (left-right in FIG. 5A) (e.g., perpendicular to both the vertical direction and the longitudinal direction).

In some embodiments, the waterbox hinge assembly 200C is assembled by securing the upper and lower support brackets 220C, 270C to the tube sheet portion 212C of the HVAC unit. The upper hinge member 320C and the lower hinge member 285C are respectively secured to the upper and lower support brackets 220C, 270C. The center hinge member 305C is secured between the upper and lower hinge members 320C, 285C using the hinge pin 235C. The fingerplate 215C and the cover-mounting band 500 to the waterbox cover 210C using an adhesive. The fingerplate 215C is then secured to the center hinge member 305C.

In some embodiments, the waterbox hinge assembly 200C can include one or more spacers. The one or more spacers can be used to, for example, modify the alignment between the different components of the waterbox hinge assembly 200C and the HVAC unit to which the assembly is being installed. This can, for example, account for manufacturing variations between various HVAC units on which the waterbox hinge assembly 200C is being installed.

Further, in some embodiments, one or more shims may be used to account for manufacturing tolerances. In some embodiments, use of shims in the waterbox hinge assembly 200C can, for example, be used to pre-tension the hinge pin 235C to reduce likelihood of sagging caused by, for example, the weight of the waterbox cover 210C.

In some embodiments, when the waterbox hinge assembly 200C is included in a waterbox hinge retrofitting kit, the kit may include the waterbox hinge assembly 200C and a suitable adhesive. It will be appreciated that one or more other items may be included in the waterbox hinge retrofitting kit, such as, but not limited to, assembly instructions, safety warnings, tools, or the like.

Figure 6A:
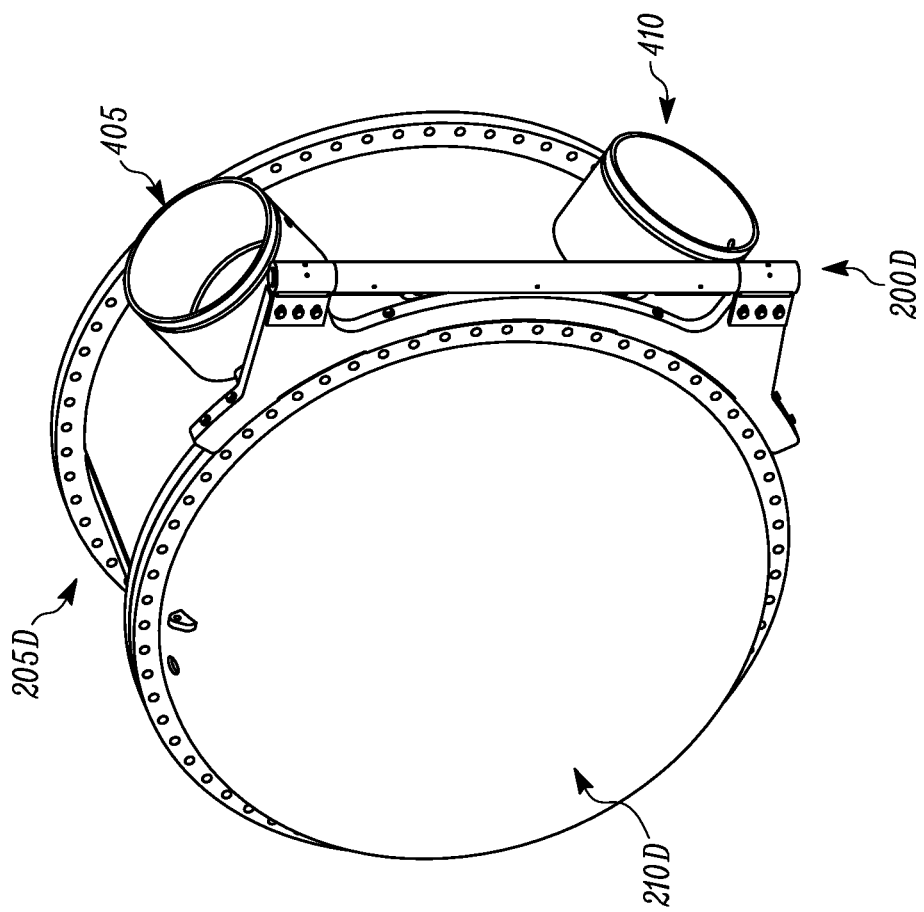
FIGS. 6A and 6B illustrate a waterbox hinge assembly in an installed configuration, according to some embodiments.
Figure 6B:
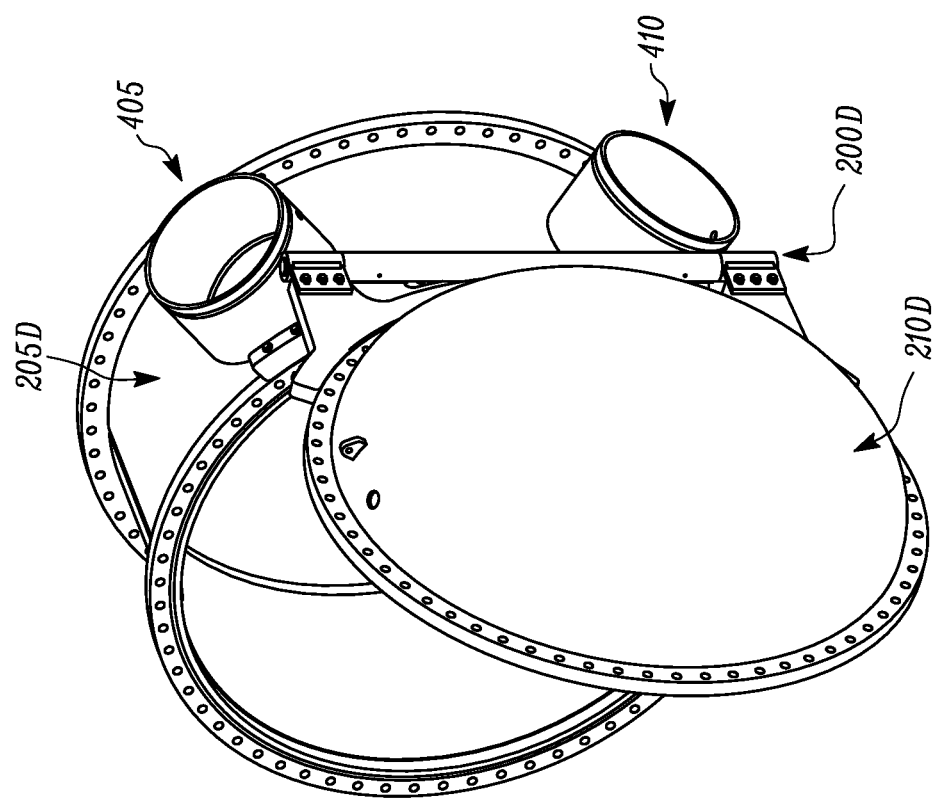

FIGS. 6A and 6B illustrate a waterbox hinge assembly 200D in an installed configuration, according to some embodiments. The waterbox hinge assembly 200D generally represents an embodiment which is an alternative design for the waterbox hinge assemblies 200A, 200B of FIGS. 2A and 2B and 200C of FIGS. 5A-5B. Aspects of the waterbox hinge assembly 200D may be the same as or similar to aspects of the waterbox hinge assemblies 200A, 200B, and 200C. In FIG. 6A, the waterbox hinge assembly 200D is shown in the installed configuration on waterbox cover 210D with the waterbox cover 210D in a closed state. In FIG. 6B, the waterbox hinge assembly 200D is shown in the installed configuration on waterbox cover 210D with the waterbox cover 210D in an opened state.

In general, the waterbox hinge assembly 200D may be installed on HVAC units in which a bolt spacing on the waterbox cover 210D is insufficient to accommodate a fingerplate (e.g., fingerplates 215A-215C in FIGS. 3A, 3B, and 5A). That is, spacing between the bolt locations on the waterbox cover 210D is relatively small. As a result, a size of the fingers of the fingerplate could be insufficient to support a weight of the waterbox cover 210D. In some embodiments, this may be a result of the bolt pattern for the particular waterbox cover. Additionally, in some embodiments, the waterbox hinge assembly 200D may be used for relatively large HVAC units in place of the waterbox hinge assemblies 200A-200C. Furthermore, the waterbox hinge assembly 200D can also be used in HVAC units in which the waterbox hinge assemblies 200A-200C may be used.

The waterbox hinge assembly 200D can be installed on an end of the HVAC unit 205D (partially illustrated). It will be appreciated that the waterbox hinge assembly 200D may be installable at either end of the HVAC unit 205D, according to some embodiments. The HVAC unit 205D is generally illustrated to be a heat exchanger, such as, but not limited to, a shell-and-tube style evaporator/condenser (see FIG. 1). The end of the HVAC unit 205D includes the waterbox cover 210D. The waterbox hinge assembly 200D is, when in the installed configuration, secured to the waterbox cover 210D and the HVAC unit 205D. In the illustrated embodiment, the waterbox hinge assembly 200D is illustrated as being on a right side of the waterbox cover 210D. As a result, the illustrated waterbox cover 210D could be opened outwardly in a left-right direction. It will be appreciated that the waterbox hinge assembly 200D could alternatively be disposed on a left side of the waterbox cover 210D (not shown). In such an embodiment, the waterbox cover 210D would be openable outwardly in a right-left direction.

Figure 7:
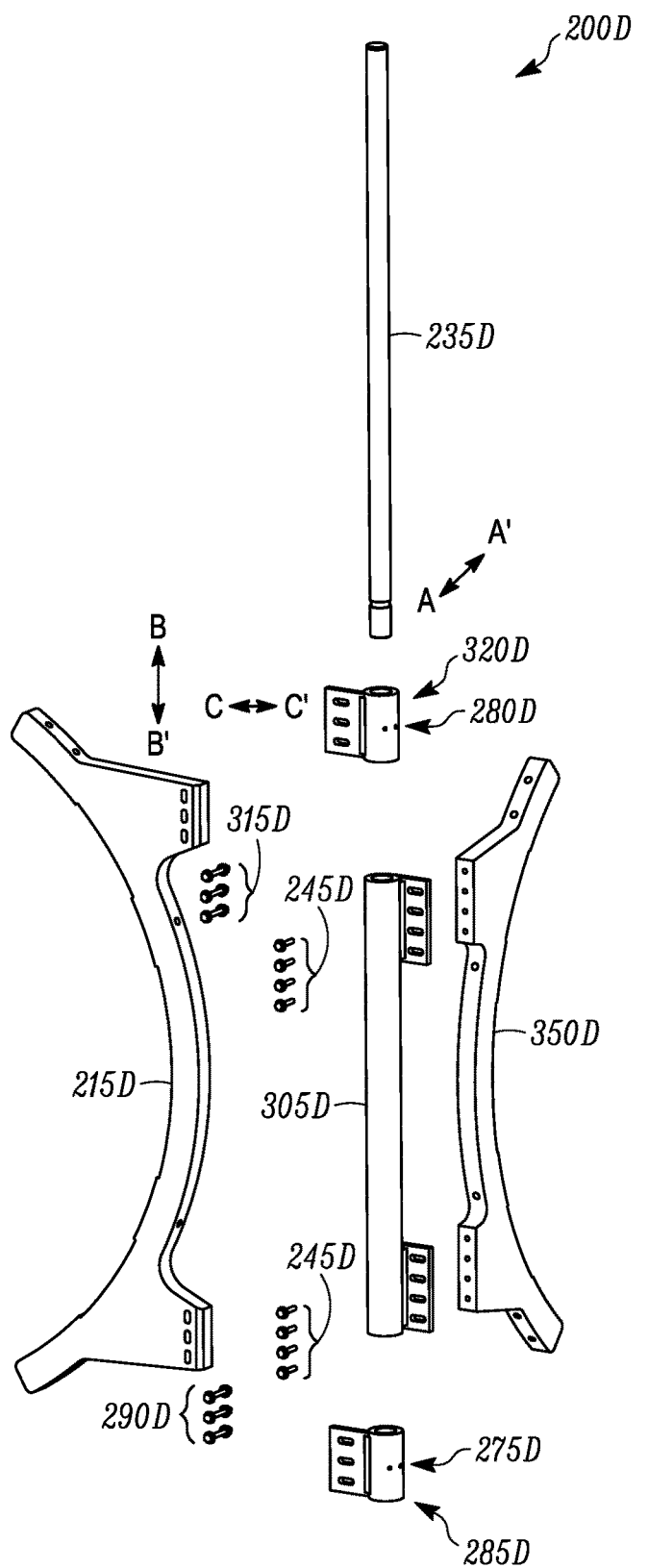
FIG. 7 illustrates an exploded view of the waterbox hinge assembly of FIGS. 6A and 6B in an uninstalled configuration, according to some embodiments.

In the embodiment of FIGS. 6A, 6B, a tube sheet portion is not disposed at a location at which the waterbox hinge assembly 200D can be fixed. Accordingly, as will be described in additional detail in accordance with FIG. 7 below, the waterbox hinge assembly 200D is fixed to the HVAC unit 205D in a different manner than the waterbox hinge assemblies 200A, 200B, 200C. Similar to the waterbox hinge assembly 200B, the waterbox hinge assembly 200D includes a hinge-mounting bracket 350D. FIG. 7 illustrates an exploded view of the waterbox hinge assembly 200D of FIGS. 6A and 6B in an uninstalled configuration, according to some embodiments. Aspects of the waterbox hinge assembly 200D may be the same as or similar to aspects of the waterbox hinge assemblies 200A-200C. For example, the waterbox hinge assembly 200D may include fasteners 245D, 290D, and 315D, as well as one or more grease fittings 280D and one or more setscrews 275D.

The waterbox hinge assembly 200D generally includes a cover mount 215D, a hinge pin 235D, a lower hinge member 285D, an upper hinge member 320D, and a hinge-mounting bracket 350D.

The hinge-mounting bracket 350D can be secured to the HVAC unit 205D. Once secured, the center hinge member 305D can be secured to the hinge-mounting bracket 350D. The upper and lower hinge members 320D, 285D can be secured to the cover mount 215D. The cover mount 215D can be secured to a center hinge member 305D via the upper and lower hinge members 320D, 285D. In some embodiments, the cover mount 215D can alternatively be referred to as the cover mounting band 215D. Once the cover mount 215D, center hinge member 305D, and the upper and lower hinge members 320D, 285D are secured together, the hinge pin 235D can be inserted into the upper hinge member 320D and slid into place, resting in the lower hinge member 285D. A snap ring (similar to snap ring 325B in FIG. 3B) can be added to a location on the hinge pin 235D at about the upper hinge member 320D to secure the hinge pin 235D in place and prevent it from sliding out of the upper hinge member 320D.

Once in the installed configuration, the waterbox hinge assembly 200D can be used to swing the waterbox cover 210D open, with the waterbox hinge assembly 200D supporting the weight of the waterbox cover 210D. In general, to open the waterbox cover 210D, a series of bolts would be removed from the waterbox cover 210D.

In some embodiments, the waterbox hinge assembly 200D is adjustable. In some embodiments the waterbox hinge assembly 200D is adjustable in three-directions. In some embodiments, the adjustability allows for improved alignment of the waterbox hinge assembly 200D with the waterbox cover 210D and the HVAC unit 205D. In some embodiments, the three-directions of adjustability generally correspond to a longitudinal direction of the HVAC unit (A-A'), a vertical direction (B-B') with respect to the floor on which the HVAC unit is located, and a left-right direction (C-C') (e.g., perpendicular to both the vertical direction and the longitudinal direction).

In some embodiments, the waterbox hinge assembly 200D can include one or more spacers. The one or more spacers can be used to, for example, modify the alignment between the different components of the waterbox hinge assembly 200D and the HVAC unit 205D to which the assembly is being installed. This can, for example, account for manufacturing variations between various HVAC units on which the waterbox hinge assembly 200D is being installed.

Further, in some embodiments, one or more shims may be used to account for manufacturing tolerances. In some embodiments, use of shims in the waterbox hinge assembly 200D can, for example, be used to reduce likelihood of sagging caused by, for example, the weight of the waterbox cover 210D. Use of shims and/or spacers would be consistent with the use of shims and/or spacers as described above.

In some embodiments, when the waterbox hinge assembly 200D is included in a waterbox hinge retrofitting kit. It will be appreciated that one or more other items may be included in the waterbox hinge retrofitting kit, such as, but not limited to, assembly instructions, safety warnings, tools, or the like.

Figure 8:
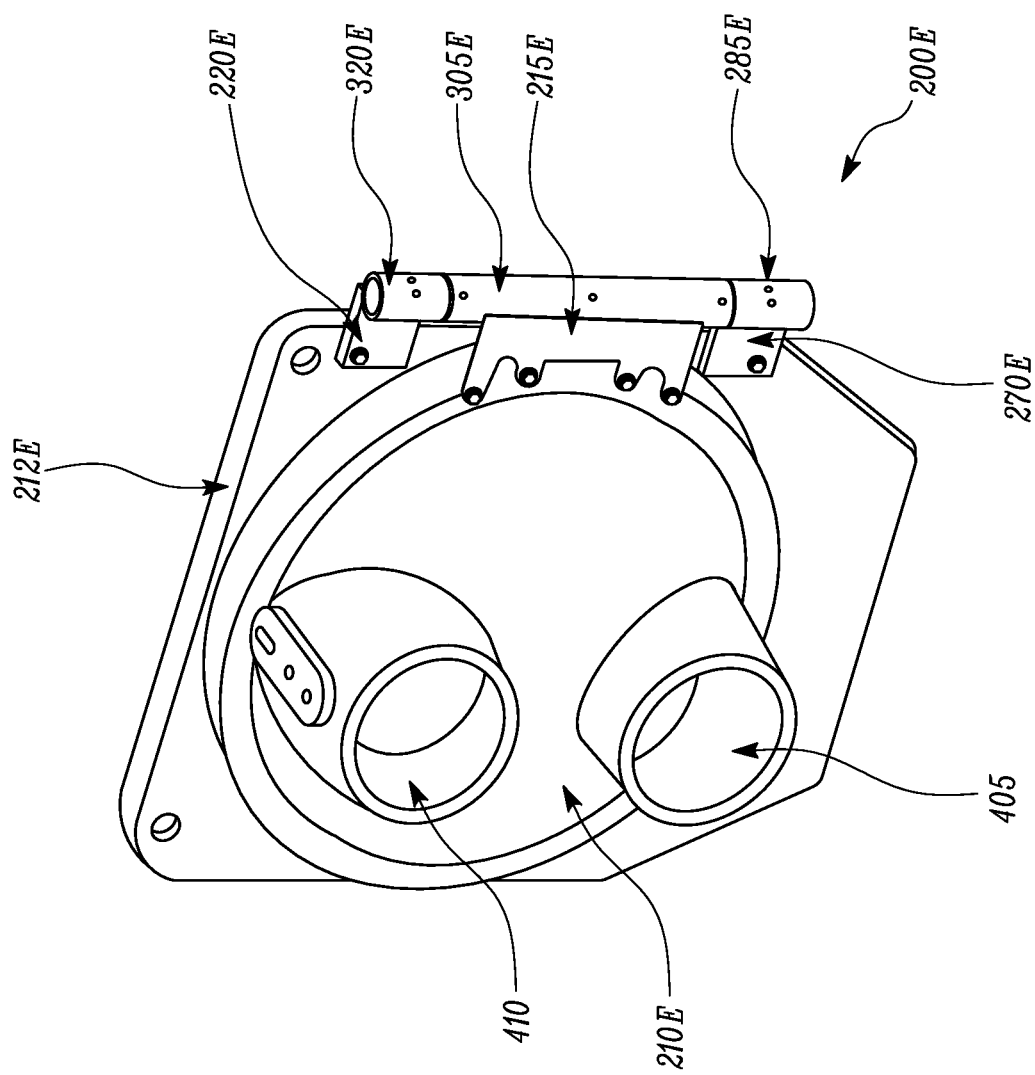
FIG. 8 illustrates a waterbox hinge assembly in an installed configuration, according to some embodiments.

FIG. 8 illustrates a waterbox hinge assembly 200E in an installed configuration, according to some embodiments. Aspects of FIG. 8 are the same as or similar to aspects of FIGS. 2A-2B, 4A-4C, 5A-5B, and 6A-6B.

The waterbox hinge assembly 200E of FIG. 8 is installed on an end of the HVAC unit 205E. It will be appreciated that the waterbox hinge assembly 200E may be installable at either end of the HVAC unit 205E, according to some embodiments. The HVAC unit 205E is generally illustrated to be a heat exchanger, such as, but not limited to, a shell-and-tube style evaporator/condenser (see FIG. 1). The end of the HVAC unit 205E includes the waterbox cover 210E. The waterbox hinge assembly 200E is, when in the installed configuration, secured to the waterbox cover 210E and the HVAC unit 205E via the upper and lower support brackets 220E, 270E (respectively), the cover mount 215E, center hinge member 305E, and upper and lower hinge members 320E, 285E (respectively). The waterbox hinge assembly 200E is secured to the HVAC unit 205E at a tube sheet portion 212E. In the illustrated embodiment, the waterbox hinge assembly 200E is illustrated as being on a right side of the waterbox cover 210E. As a result, the illustrated waterbox cover 210E could be opened outwardly in a left-right direction. It will be appreciated that the waterbox hinge assembly 200E could alternatively be disposed on a left side of the waterbox cover 210E (not shown). In such an embodiment, the waterbox cover 210E would be openable outwardly in a right-left direction.

The waterbox hinge assembly 200E may generally represent a waterbox hinge assembly that is installed (at least partially) during production of the HVAC unit 205E. The waterbox hinge assembly 200E may be similar to the waterbox hinge assembly 200A. In some embodiments, because the waterbox hinge assembly 200E is at least partially installed during the manufacturing process of the HVAC unit 205E, the waterbox hinge assembly 200E may be modified from the waterbox hinge assembly 200A such that adjustability of the various components is removed. That is, because the waterbox hinge assembly 200E is partially installed during manufacturing, it may be possible to control manufacturing tolerances such that adjustability of the components of the waterbox hinge assembly 200E relative to each other may not be necessary.

For example, the waterbox hinge assemblies 200A-200D may have adjustability in A-A', B-B', and C-C' directions (see, e.g., FIG. 3A). This adjustability may enable the waterbox hinge assemblies 200A-200D to be retrofit onto a variety of different HVAC units. Alternatively, when at least a portion of the waterbox hinge assembly 200E is installed during production of the HVAC unit 205E, components of the waterbox hinge assembly 200E may be specifically fit to the HVAC unit 205E. For example, in some embodiments, the components of the waterbox hinge assembly 200E can be designed such that they are aligned with the waterbox cover 210E and the HVAC unit 205E. That is, in some embodiments, holes in the HVAC unit 205E for receiving the various fasteners to assemble the waterbox hinge assembly 200E may be designed such that they are aligned with holes in the waterbox hinge assembly 200E and assembly may be possible without adjustment in the A-A', B-B', or C-C' since the fit between the components is designed for the HVAC unit 200E.

Further, in the manufacturing process for the HVAC unit 205E, the tube sheet 212E may be modified such that the upper hinge member 320E and lower hinge member 285E may be secured to the tube sheet 212E.

In some embodiments, the entire waterbox hinge assembly 200E may be installed during the manufacturing process. In some embodiments, a portion of the waterbox hinge assembly 200E may be installed during the manufacturing process. For example, in some embodiments, holes may be formed in the waterbox cover 210E and the HVAC unit 205E so that the waterbox hinge assembly 200E may be secured in place in the field. In some embodiments, aspects which require precise alignment (e.g., hole formation) may be completed during the manufacturing process.

ASPECTS

It is to be appreciated that any one of aspects 1-8 can be combined with any one of aspects 9-15, and/or 16-20. Any one of aspects 9-15 can be combined with any one of aspects 16-20.

Aspect 1

A method of retrofitting a heating, ventilation, and air conditioning (HVAC) unit with a waterbox hinge assembly, comprising:
securing a hinge-mounting bracket to the HVAC unit;
assembling a center hinge member to a cover mount and upper and lower hinge members to the hinge-mounting bracket;
securing a hinge pin to the center hinge member and the upper and lower hinge members; and
securing the cover mount to a waterbox cover disposed on an end of the HVAC unit.

Aspect 2

The method according to aspect 1, wherein the cover mount includes a fingerplate.

Aspect 3

The method according to any one of aspects 1-2, wherein the hinge-mounting bracket includes upper and lower support brackets secured to a tube sheet portion of the HVAC unit.

Aspect 4

The method according to any one of aspects 2-3, wherein securing the cover mount includes bolting the cover mount to the waterbox cover.

Aspect 5

The method according to any one of aspects 2-4, wherein securing the cover mount includes adhering the cover mount to the waterbox cover with an adhesive.

Aspect 6

The method according to any one of aspects 2-5, further comprising identifying a location for securing the cover mount to the waterbox cover using a fingerplate-locating gauge.

Aspect 7

The method according to aspect 6, further comprising identifying a location for securing the hinge-mounting bracket using an installation bracket.

Aspect 8

The method according to any one of aspects 6-7, wherein securing the cover mount includes adhering the cover mount to the waterbox cover with an adhesive.

Aspect 9

A waterbox hinge assembly, comprising:
a cover mount that is securable to a waterbox cover of a heating, ventilation, and air conditioning (HVAC) unit;
a hinge assembly, comprising:
an upper hinge member;
a lower hinge member;
a center hinge member disposed between the upper and lower hinge members; and
a hinge pin; and
a hinge-mounting bracket that is securable to the HVAC unit,
wherein in an installed configuration,
the center hinge member is fixed to one of the cover mount or the hinge-mounting bracket;
the upper and lower hinge members are fixed to the other of the hinge-mounting bracket or the cover mount; and
the hinge pin is inserted into the upper and lower hinge members and the center hinge member.

Aspect 10

The waterbox hinge assembly according to aspect 9, wherein the cover mount is a fingerplate.

Aspect 11

The waterbox hinge assembly according to any one of aspects 9-10, wherein in the installed configuration, the hinge pin is secured in place by one or more set screws.

Aspect 12

The waterbox hinge assembly according to any one of aspects 10-11, wherein the hinge-mounting bracket comprises an upper support bracket and a lower support bracket, the upper and lower support brackets being fixed to the HVAC unit when in the installed configuration.

Aspect 13

The waterbox hinge assembly according to any one of aspects 10-12, wherein the waterbox hinge assembly is adjustable in a plurality of directions.

Aspect 14

The waterbox hinge assembly according to aspect 13, wherein the waterbox hinge assembly is adjustable in three directions.

Aspect 15

The waterbox hinge assembly according to any one of aspects 10-14, wherein the fingerplate includes a cover-mounting band.

Aspect 16

A waterbox hinge assembly retrofitting kit, comprising:
a waterbox hinge assembly, comprising:
a cover mount that is securable to a waterbox cover of a heating, ventilation, and
air conditioning (HVAC) unit;
a hinge assembly, comprising:
an upper hinge member;
a lower hinge member;
a center hinge member disposed between the upper and lower hinge members; and
a hinge pin; and
a hinge-mounting bracket that is securable to the HVAC unit,
wherein in an installed configuration,
the center hinge member is fixed to one of the cover mount or the hinge-mounting bracket;
the upper and lower hinge members are fixed to the other of the hinge-mounting bracket or the cover mount; and
the hinge pin is inserted into the upper and lower hinge members and the center hinge member.

Aspect 17

The waterbox hinge assembly retrofitting kit according to aspect 16, wherein the cover mount includes a fingerplate.

Aspect 18

The waterbox hinge assembly retrofitting kit according to any one of aspects 16-17, further comprising a fingerplate-locating gauge.

Aspect 19

The waterbox hinge assembly retrofitting kit according to any one of aspects 17-18, further comprising an installation bracket.

Aspect 20

The waterbox hinge assembly retrofitting kit according to any one of aspects 17-19, wherein the fingerplate includes a cover-mounting band.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

What is claimed is:

1. A waterbox hinge assembly, comprising:
a cover mount that is securable to a waterbox cover of a heating, ventilation, and air conditioning (HVAC) unit;
a hinge assembly, comprising:
an upper hinge member;
a lower hinge member;
a center hinge member disposed between the upper and lower hinge members; and
a hinge pin; and
a hinge-mounting bracket that is securable to the HVAC unit,
wherein in an installed configuration,
the center hinge member is fixed to one of the cover mount or the hinge-mounting bracket;
the upper and lower hinge members are fixed to the other of the hinge-mounting bracket or the cover mount; and
the hinge pin is inserted into the upper and lower hinge members and the center hinge member,
wherein the waterbox hinge assembly is adjustable in a plurality of directions.

2. The waterbox hinge assembly according to claim 1, wherein in the installed configuration, the hinge pin is secured in place by one or more set screws.

3. The waterbox hinge assembly according to claim 1, wherein the cover mount includes a fingerplate.

4. The waterbox hinge assembly according to claim 3, wherein the hinge-mounting bracket comprises an upper support bracket and a lower support bracket, the upper and lower support brackets being fixed to the HVAC unit when in the installed configuration.

5. The waterbox hinge assembly according to claim 1, wherein the waterbox hinge assembly is adjustable in three directions.

6. The waterbox hinge assembly according to claim 3, wherein the fingerplate includes a cover-mounting band.

7. A waterbox hinge assembly retrofitting kit, comprising:
a waterbox hinge assembly, comprising:
a cover mount that is securable to a waterbox cover of a heating, ventilation, and air conditioning (HVAC) unit;
a hinge assembly, comprising:
an upper hinge member;
a lower hinge member;

a center hinge member disposed between the upper and lower hinge members; and a hinge pin; and a hinge-mounting bracket that is securable to the HVAC unit, wherein in an installed configuration, the center hinge member is fixed to one of the cover mount or the hinge-mounting bracket;

the upper and lower hinge members are fixed to the other of the hinge-mounting bracket or the cover mount; and the hinge pin is inserted into the upper and lower hinge members and the center hinge member, and wherein the waterbox hinge assembly is adjustable in a plurality of directions.

8. The waterbox hinge assembly retrofitting kit according to claim 7, wherein the cover mount includes a fingerplate.

9. The waterbox hinge assembly retrofitting kit according to claim 8, further comprising a fingerplate-locating gauge.

10. The waterbox hinge assembly retrofitting kit according to claim 8, further comprising an installation bracket.

11. The waterbox hinge assembly retrofitting kit according to claim 8, wherein the fingerplate includes a cover-mounting band.

* * * * *